June 26, 1928.

G. A. ROBINSON

CARTON MAKING MACHINE

Filed Jan. 4, 1927     14 Sheets-Sheet 1

Inventor
George A Robinson
by
Munn Cameron Lewis+Kerkam
Attorneys.

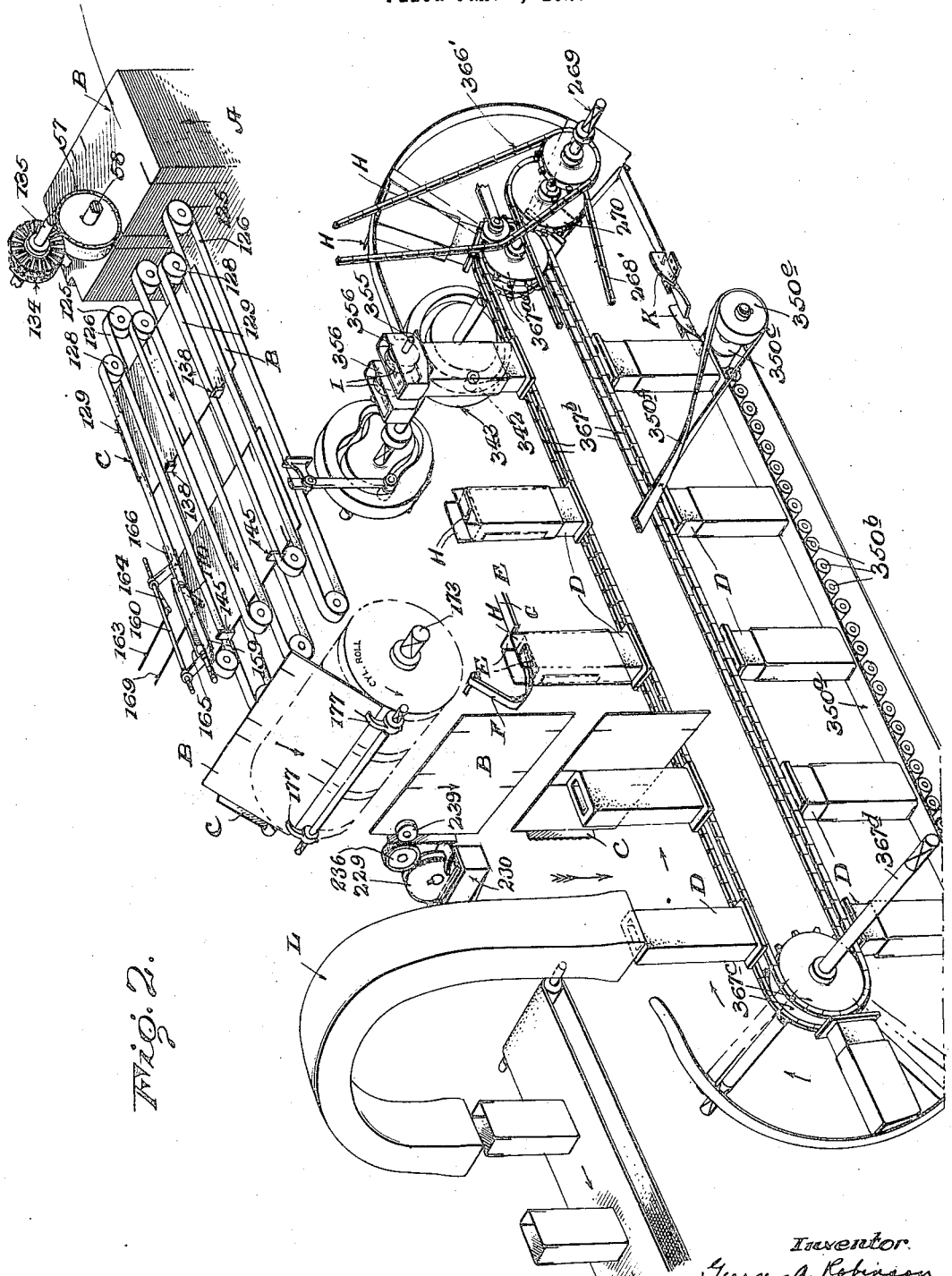

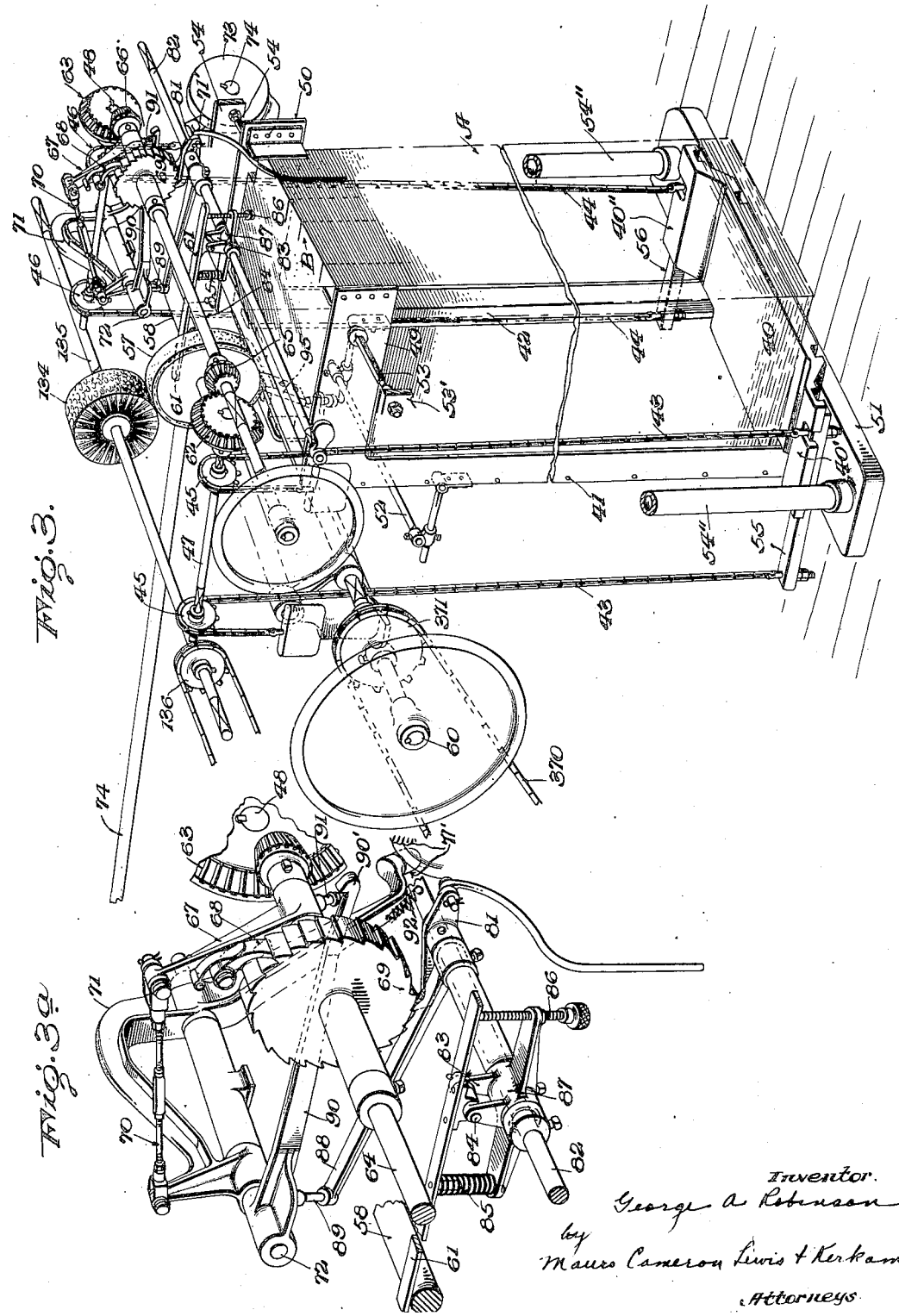

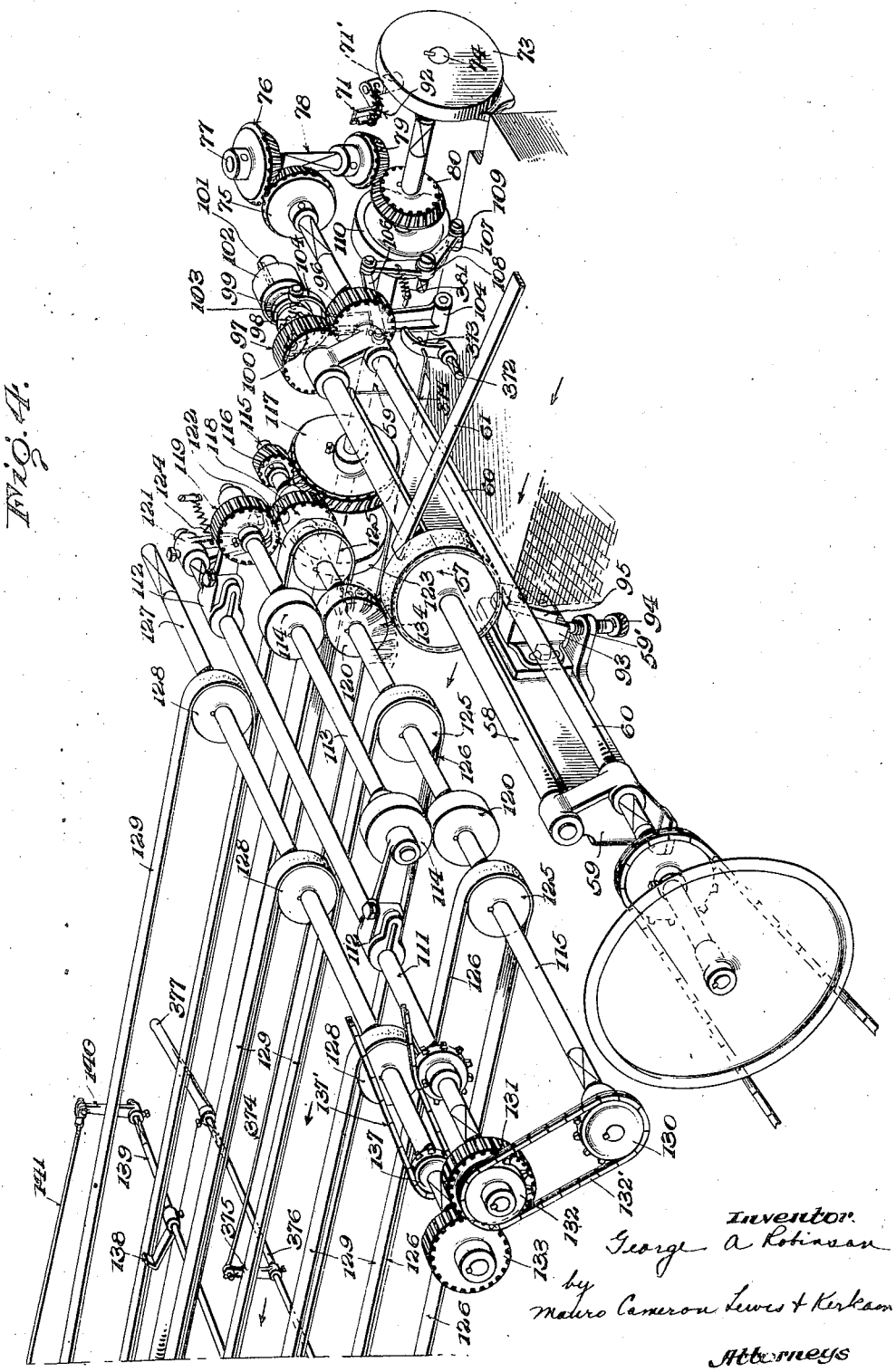

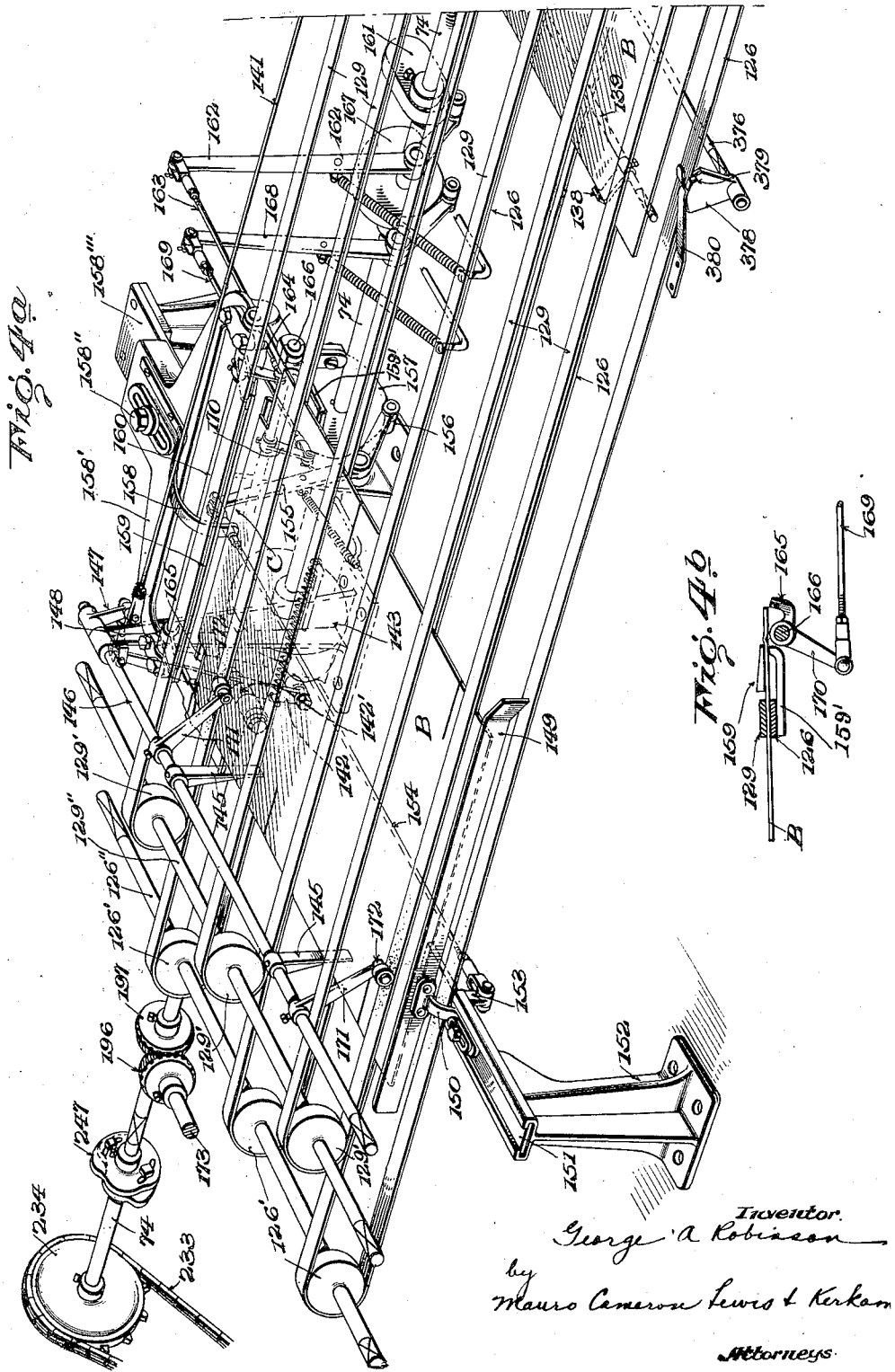

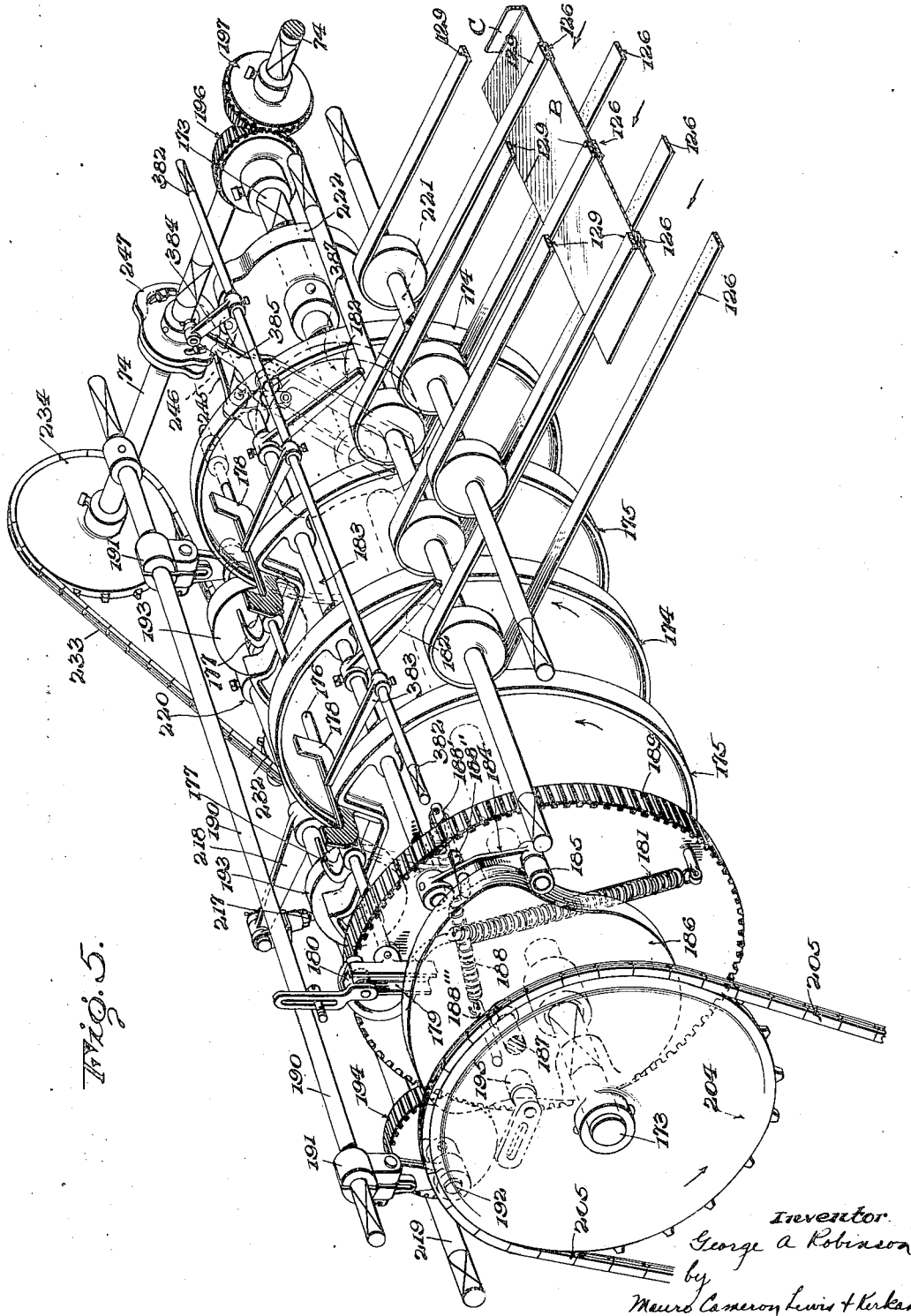

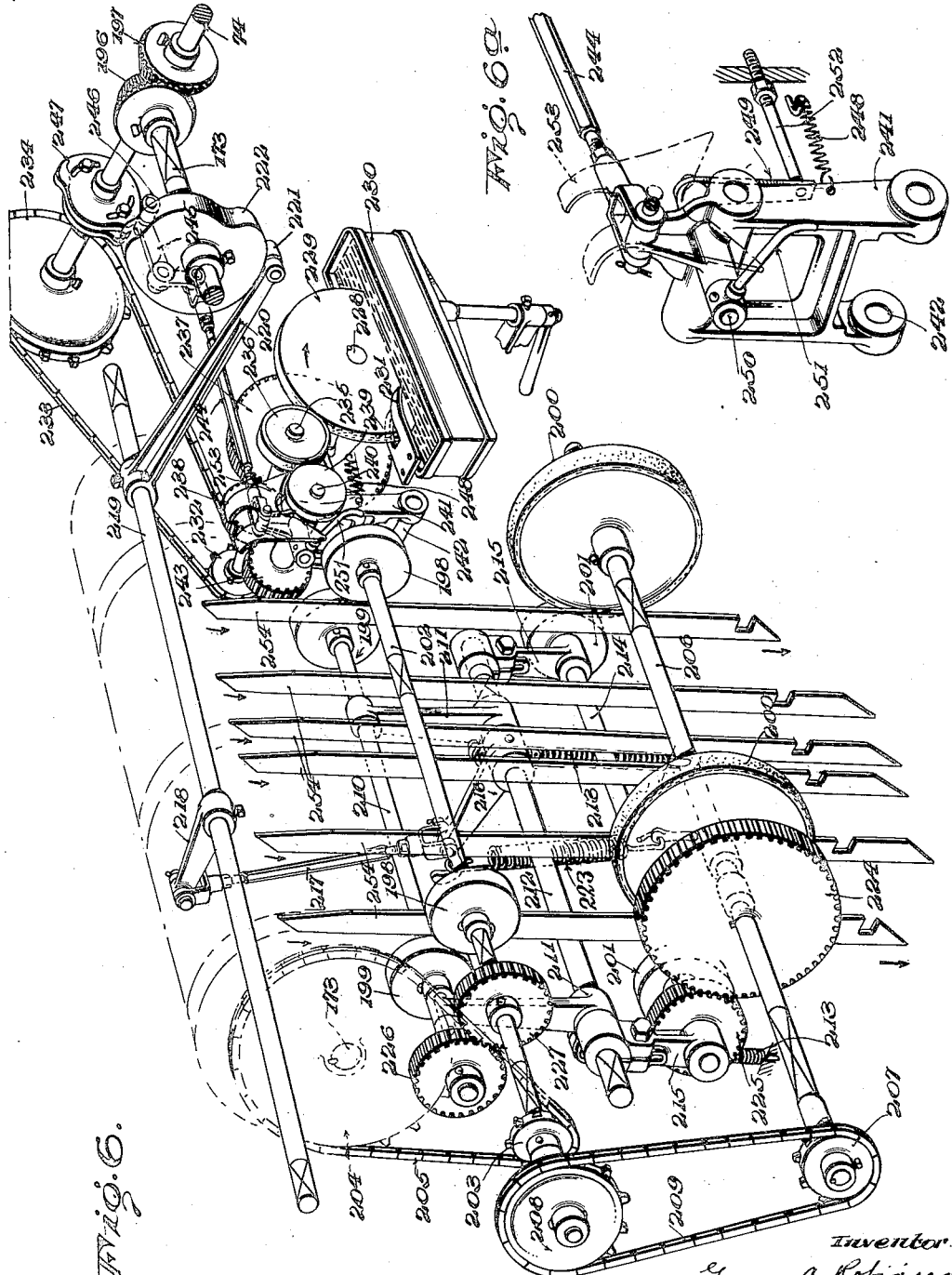

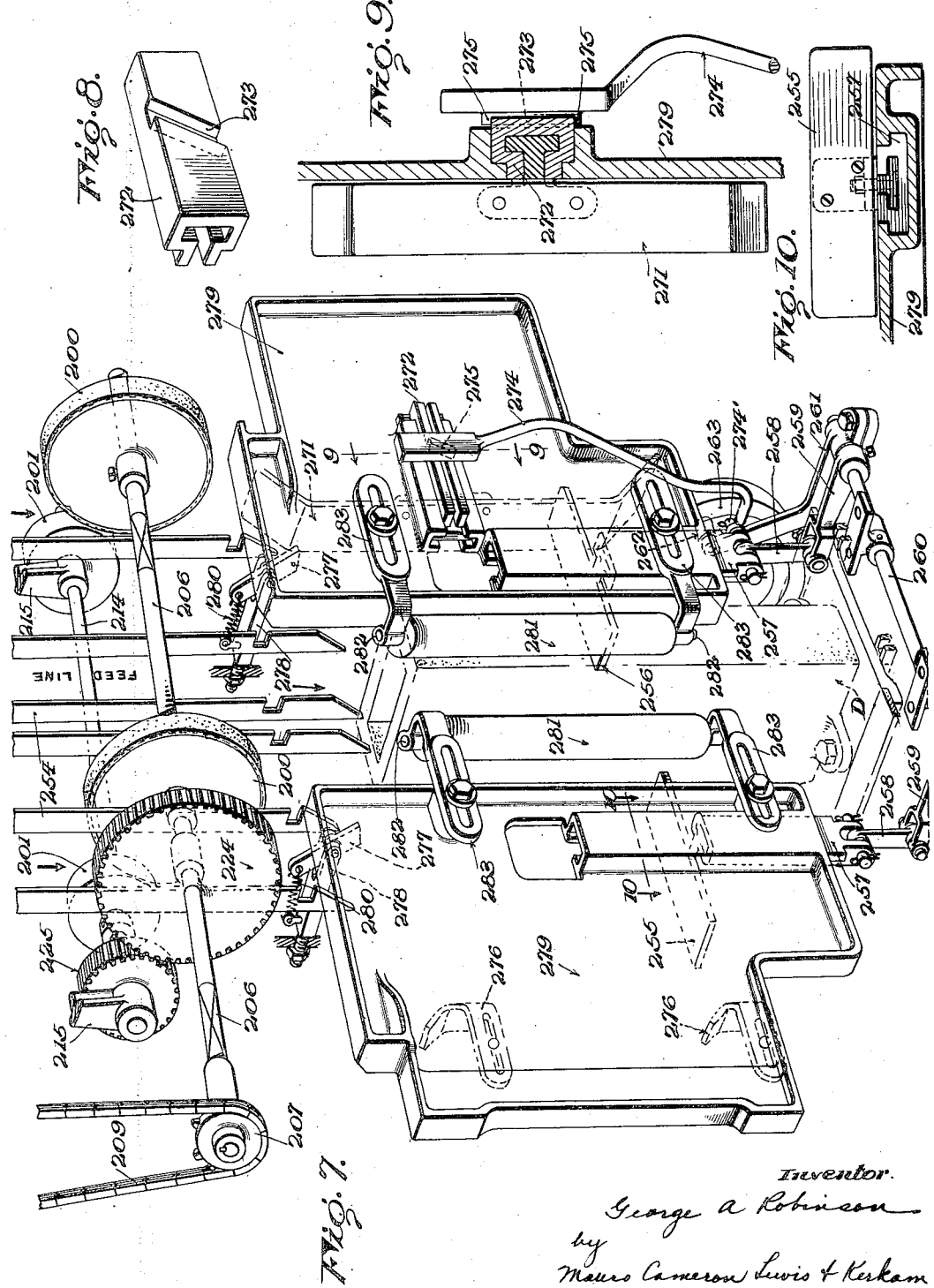

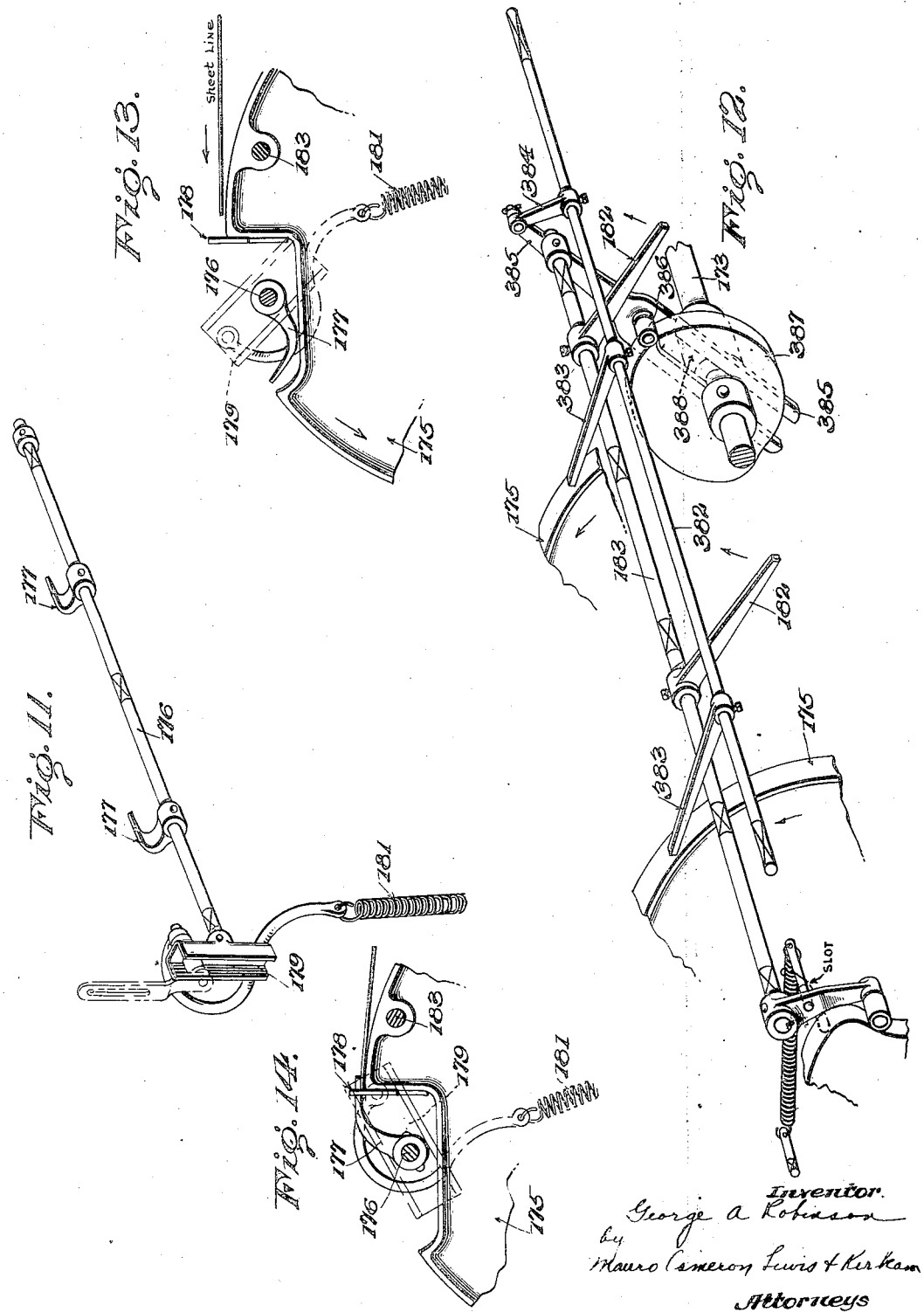

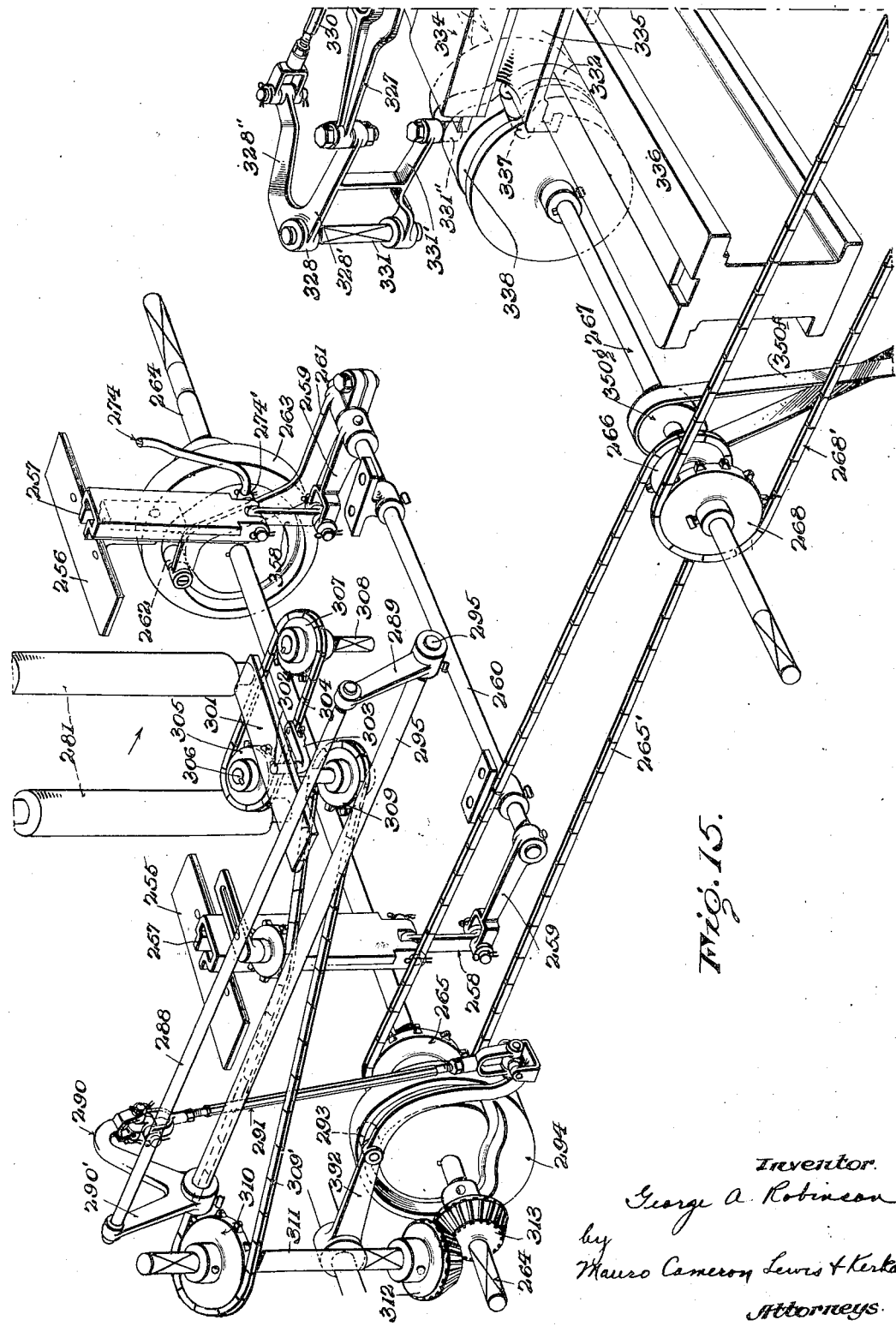

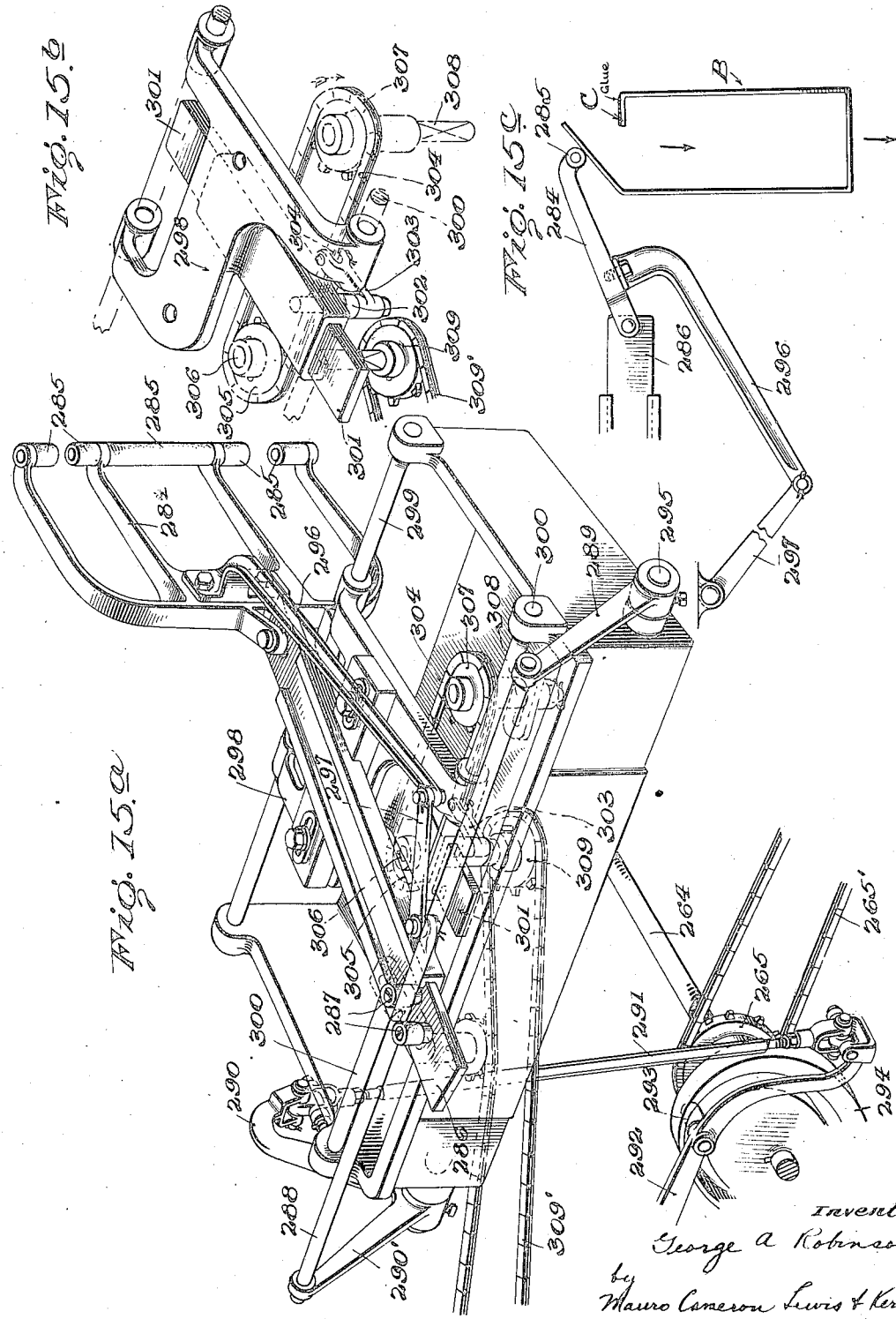

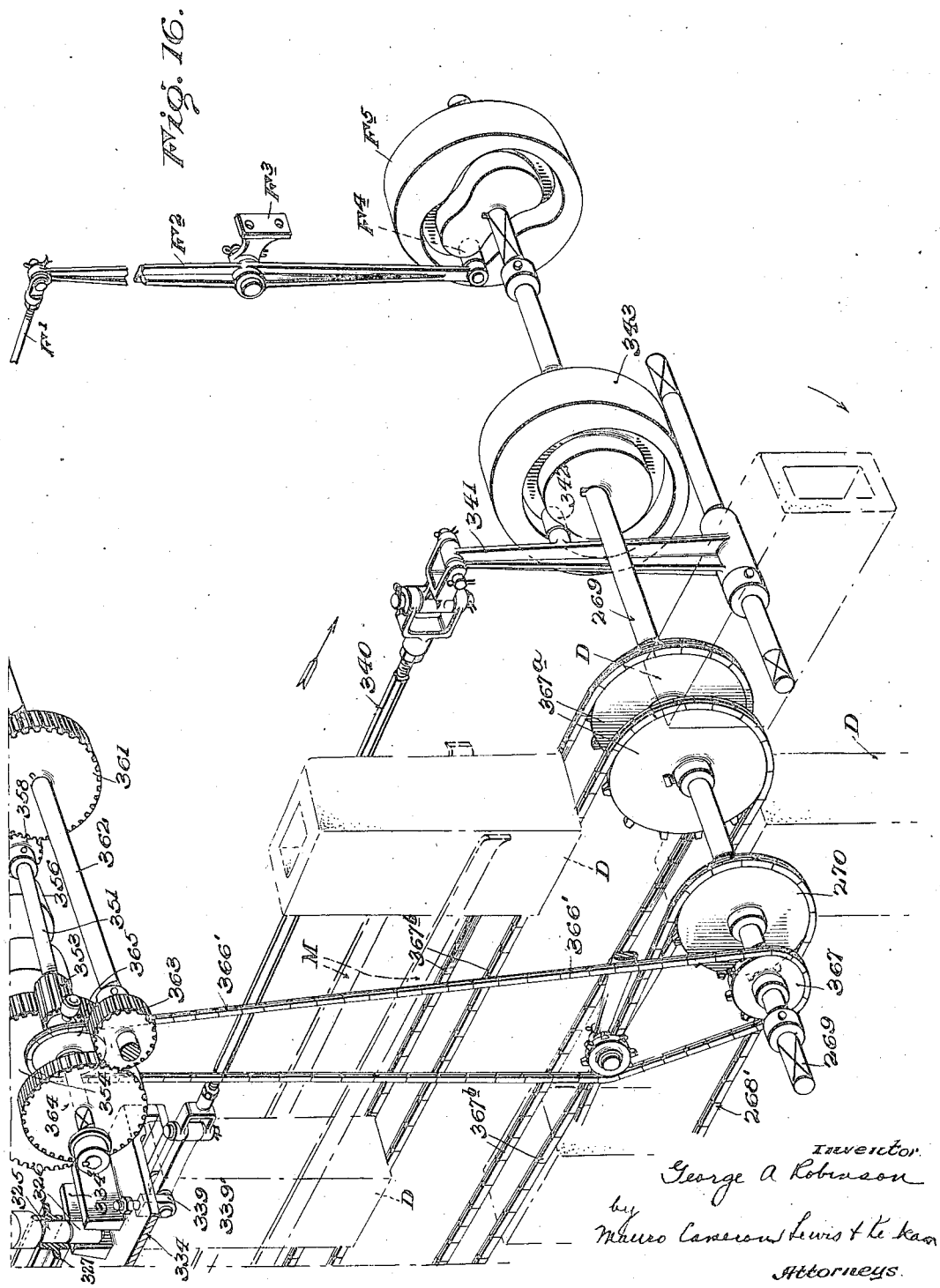

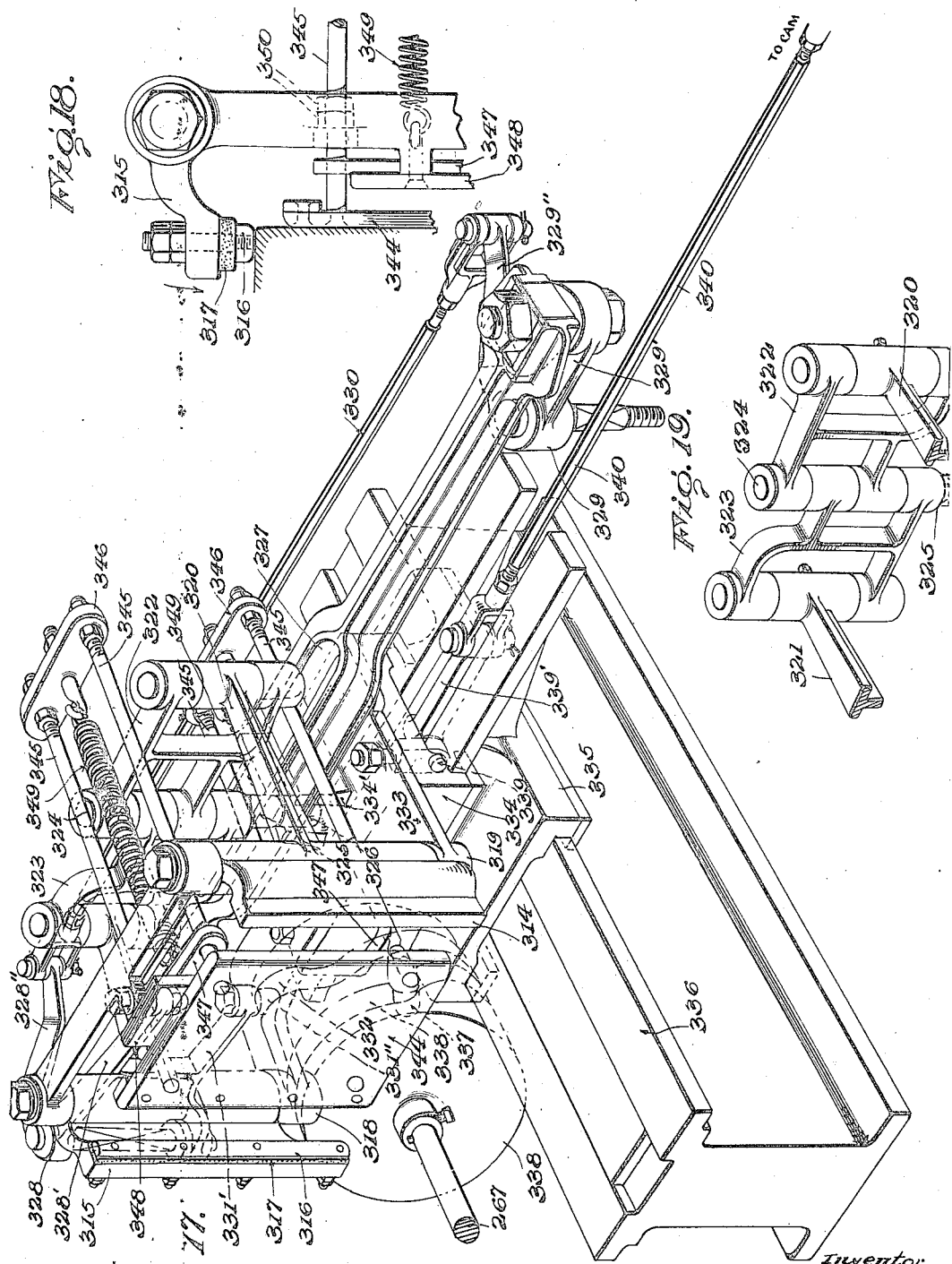

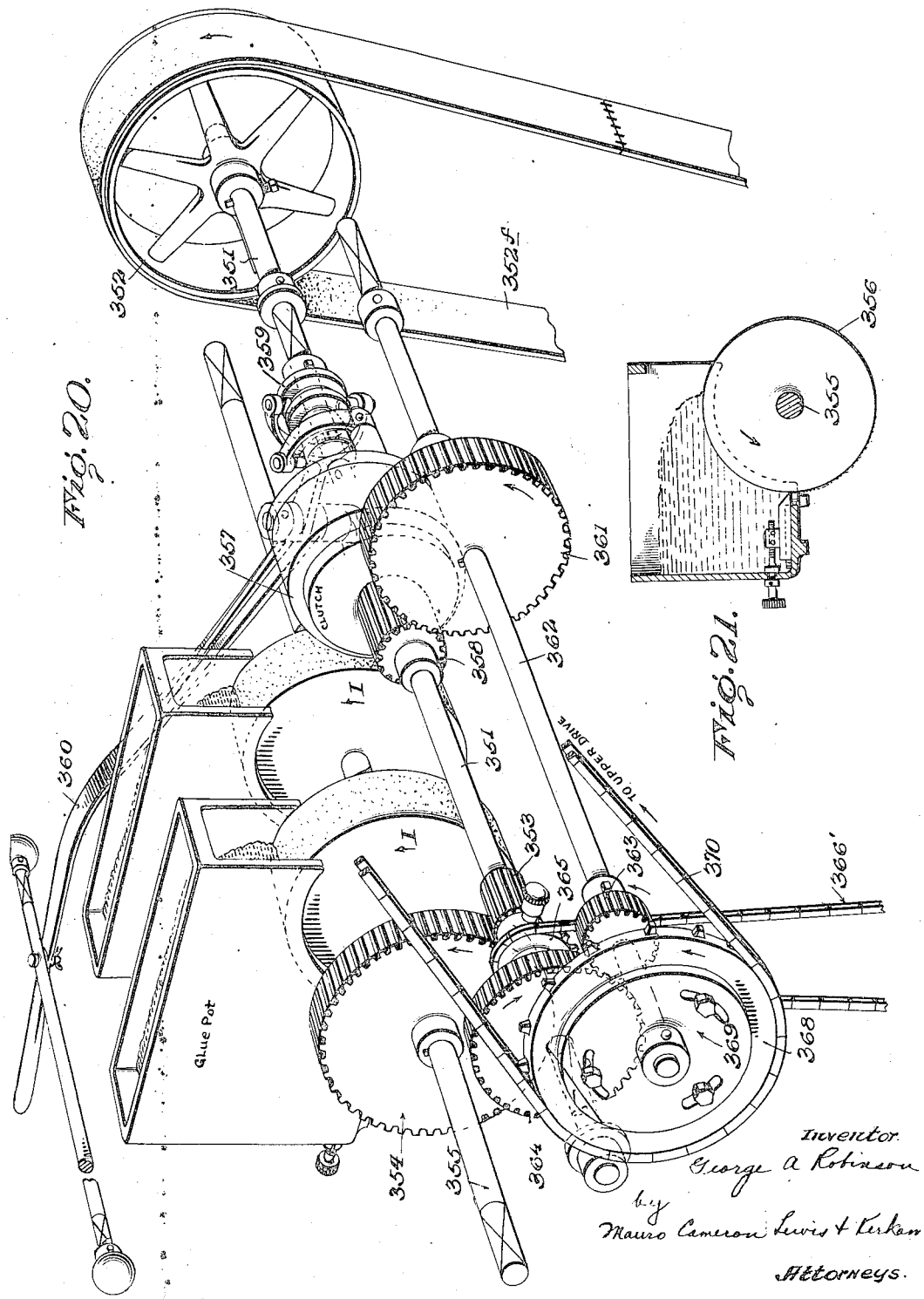

Patented June 26, 1928.

1,674,921

UNITED STATES PATENT OFFICE.

GEORGE A. ROBINSON, OF BATTLE CREEK, MICHIGAN, ASSIGNOR TO JOHNSON AUTOMATIC SEALER CO., LTD., OF BATTLE CREEK, MICHIGAN, A PARTNERSHIP ASSOCIATION LIMITED OF MICHIGAN.

CARTON-MAKING MACHINE.

Application filed January 4, 1927. Serial No. 158,978.

This invention relates to carton making machines, and particularly is an improvement in machines for automatically folding or wrapping a paper blank about a movable form secured on a conveyor or the like.

It has heretofore been proposed to stack the carton blanks on a stationary, inclined table and to feed said blanks in succession from the stack, by feed wheels and conveyor belts that carry the blank into the path of travel of a continuously moving form where means are provided for wrapping the blank about said form. A machine of this type is disclosed in Patent No. 1,096,918, granted May 19, 1914, H. L. Johnson.

The principal objects of this invention are to provide a machine such as above referred to, which embodies feeding devices for the blanks that contribute to greater speed, accuracy and efficiency of the blank feeding means; which enables the production of a tight seam when the blank is wrapped about the forming block; which insures the handling of a great number of blanks and consequently a prolonged operation of the machine with one load thereof; which requires minimum attention by the operator and less frequent adjustments of the operating parts; and which is an expeditious and practical machine for making cartons, that may be operated at high speeds and is well adapted for use in the packaging industry, especially where quantity production is desirable.

This invention will be better understood by reference to the accompanying drawings illustrating one embodiment of the inventive idea, and wherein—

Fig. 2 is a diagrammatic perspective view showing the travel of the blanks through the machine and the manner of forming the cartons.

Fig. 3 is an enlarged detail perspective view, showing the pile elevator and the blank feeder, operating mechanism therefor, and the detector device.

Figure 1:
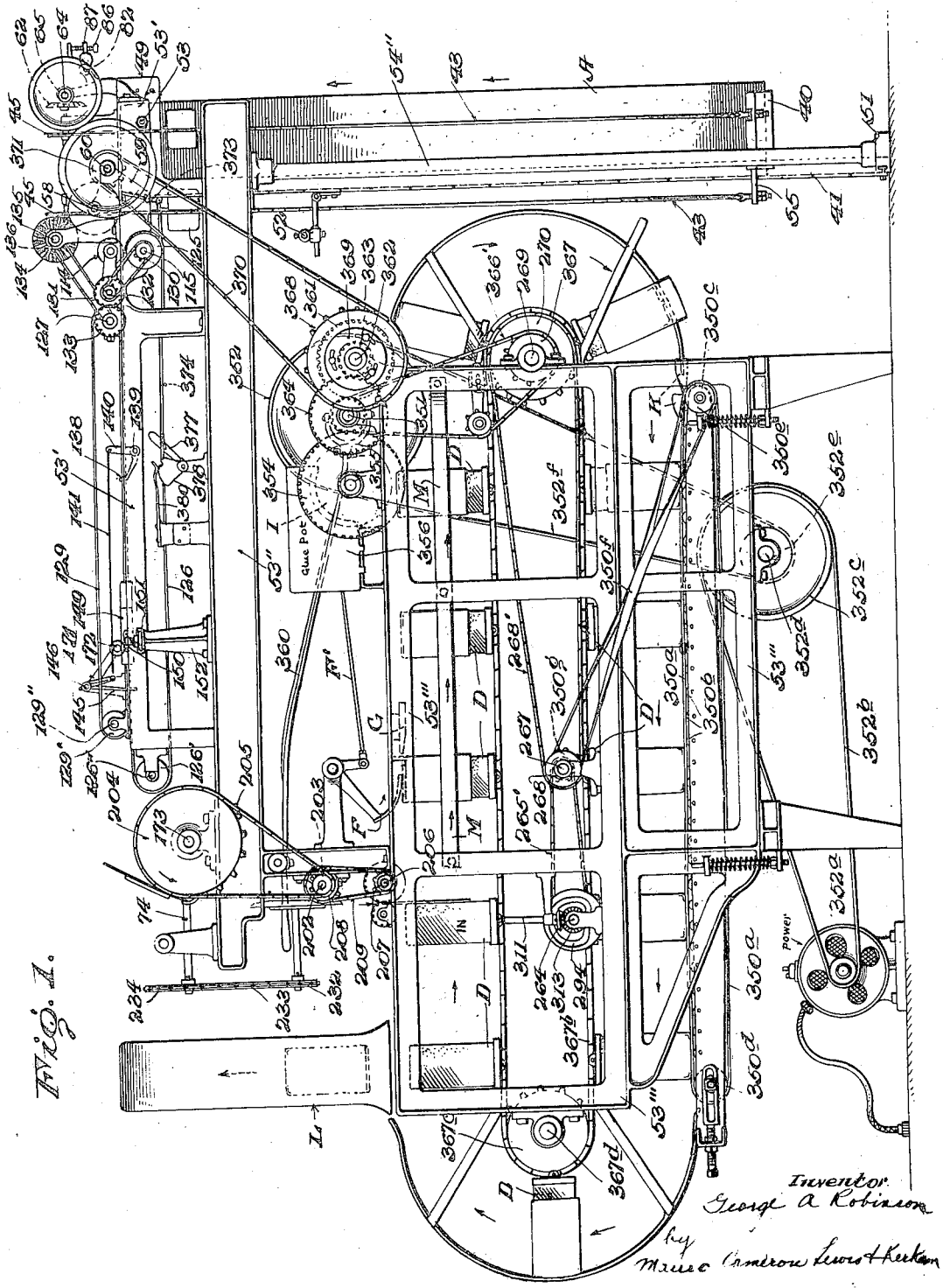
Fig. 1 is a side elevation of a carton making machine embodying the present invention, showing the blank feeding mechanism and the mechanism for sealing and closing the end flaps of the carton.

Fig. 3ª is a view similar to Fig. 3, showing details of the operating mechanism and the detector device therein illustrated.

Fig. 4 is a detail perspective view, showing the blank feeder and the receiving end of a blank conveyor onto which the blanks are fed laterally from the top of the pile or stack carried by the elevator.

Fig. 4ª is a view similar to Fig. 4, showing the delivery end of the conveyor, together with blank registering devices and mechanism for bending the side sealing flap of the carton.

Fig. 4ᵇ is a transverse sectional view, with parts omitted, of the bending mechanism shown in Fig. 4ª.

Fig. 5 is an enlarged perspective view of the blank gripping and turning mechanism disposed at the delivery end of the blank conveyor.

Fig. 6 is an enlarged detail perspective view of means for applying adhesive to the side sealing flap of the carton, and devices for feeding the blank from the gripping mechanism into the path of travel of the carton conveyor.

Fig. 6ª is a perspective detail of a detector device controlling the operation of the adhesive applying means.

Fig. 7 is an enlarged detail perspective view of mechanism for folding the front and side panels of the blank on the conveyor form, together with blank supporting and registering means disposed adjacent the path of travel of said form.

Figs. 8, 9 and 10 are detail views in perspective, side elevation, and top plan, respectively, showing parts of the blank supporting and registering means illustrated in Fig. 7.

Figs. 11 and 12 are detail perspective views of the blank grippers and guide fingers respectively, shown in Fig. 5.

Figs. 13 and 14 are side elevations of the blank grippers illustrated in Figs. 5 and 11, showing the released and gripping positions respectively of said grippers.

Fig. 15 is an enlarged detail perspective view of driving connections for the blank supporting, registering, folding, and pressing mechanisms disposed adjacent the carton conveyor.

Fig. 15ª is an enlarged perspective view, showing mechanism arranged to fold the rear panel on the form and affix the side sealing flap to said panel.

Figs. 15ᵇ and 15ᶜ are detail views in perspective and top plan, respectively, showing parts of the mechanism illustrated in Fig. 15ª.

Fig. 16 is an enlarged detail perspective view, showing driving connections for the carton conveyor and the carton pressing, adhesive applying and flap tucking mechanisms.

Fig. 17 is an enlarged detail perspective view of the carton pressing mechanism.

Figs. 18 and 19 are detail views in top plan and perspective, respectively, showing parts of the mechanism illustrated in Fig. 17;

Fig. 20 is an enlarged perspective view of the adhesive applying devices, together with the main drive for the machine and the clutch for controlling the same; and Fig. 21 is a sectional view longitudinally of the machine, showing one of the adhesive applying devices illustrated in Fig. 20.

Referring to the drawings, wherein like reference characters designate like parts throughout the several views, it is pointed out that the invention is shown for purposes of illustration, in association with a machine for making unlined cartons. The invention could, however, be embodied in a machine for making lined cartons, in which case the liners would be supplied to the conveyor forms approximately at the point indicated by the downwardly directed vertical arrow in Fig. 2, through the medium of suitable mechanism such as shown, for example, in my copending application Serial No. 32,410, filed May 23, 1925.

*Stack or pile elevator, detector, and blank feeder. Figs. 1, 2, 3 and 4.*

The stack or pile of blanks A is supported vertically on an elevator plate 40 and held on two corners by guides 41, 42. The elevator plate 40 is carried by four chains, two on either side of the elevator, which chains are indicated at 43 and 44. These chains pass over suitable sprockets 45, 46 which are mounted on shafts 47 and 48, respectively, driven by suitable mechanism to elevate the stack of cartons as the blanks are withdrawn from the top thereof. The top of the stack of carton blanks is further retained in proper position by guide plates 49 and 50 which extend the full width of the stack and slightly to the rear of the same. The side guides 41 and 42 are held in proper position at their lower ends by bolts which hold them against the base plate 51 of the elevator and are held at their upper ends by a cross rod 52 mounted on a stationary part of the machine. The side plates 49 and 50 are further held in position by rods 53 and 54, the outer ends of which are fastened to machine frame pieces 53' and 54'. Each of these frame pieces is supported on a frame piece 53" disposed at one side of the machine and in turn supported on one of the side frames 53''' of the machine and on one of the legs 54'' disposed adjacent the forward ends of said side frames. The elevator plate 40 rests upon square bars 55 and 56 which hang on the ends of the chains 43 and 44, respectively, grooved projections 40' and 40'' on the elevator plate 40 resting on the bars 55 and 56.

The topmost blank B in the stack of carton blanks is fed from the pile by means of a friction roller 57, which is a rubber covered roller that is maintained in positive contact with the top of the stack. This feeding roller 57 is carried on a shaft 58 and is rotated intermittently at definite fixed intervals to feed the topmost blank off the stack in a lateral direction. The shaft 58 is carried in suitable bearings on a yoke 59, the yoke 59 being supported on a shaft 60 mounted in bearings on the frame pieces 53' and 54'. This shaft 60 is the main driving shaft of the blank feeding mechanism. The yoke 59 is loosely mounted on shaft 60 so that the weight of said yoke will maintain the pressure of the roll 57 against the top of the stack of blanks. Suitable stops (not shown) are provided to limit the downward movement of the yoke 59. It is extremely desirable, for the positive feeding of the topmost blank, that the pressure of the feeding roller 57 be maintained constant thereon. It has been found in practice that the carton blanks do not pile up in the stack uniformly at all times and that there is a difference in the regularity of the surface so that the topmost blanks in the stack do not lie perfectly level but that the surface is somewhat wavy and curved. In view of this fact, if the detector finger 61, which determines the height of the stack, rests on the pile of carton blanks, there is found to be a variation in the pressure of the feed roller 57 on the top of the pile. It has therefore been found desirable to associate the detector finger directly with the feed roll shaft 58, so that the stack of cartons will be fed upward until the feed roll has been raised to a definite position which will insure maintaining of the pressure of this roll constant at all times on the top of the stack. The elevation of the stack or pile of cartons is controlled by the detector finger 61 through the following mechanism.

Mounted on the shafts 47 and 48 are bevel gears 62 and 63. A shaft 64, carried in suitable bearings on the frame pieces 53', extends transversely of the machine and carries bevel pinions 65 and 66 which engage the gears 62 and 63 respectively. Mounted loose on shaft 64 is an arm 67 provided with a spring actuated pawl 68 which engages a ratchet 69 mounted fast on shaft 64. The arm 67 is rocked on shaft 64 by means of a connecting rod 70, one end of which is attached to the arm 67 and the other end to an arm 71. Arm 71 is mounted intermediate its ends on a stud 72 secured to the frame piece 54', said arm being rocked about its pivot through the action of a cam 73 mounted on shaft 74 journalled in suitable bearings on the frame piece 54'. Shaft 74 is constantly rotated through suitable driving connections from the shaft 60. These driving connections comprise a bevel gear 75 mounted fast on shaft 60 and a bevel gear 76 mounted on a vertical shaft 77 carried in a suitable bearing 78 on the frame piece 54'. The shaft 77 carries at its lower end a bevel gear 79 which meshes with a bevel gear 80 mounted on shaft 74. The shaft 74 is a time shaft and makes one complete revolution for each cycle of operation of the machine. The rocking of the arm 67, through the engagement of the pawl 68 with the ratchet 69, causes the shaft 64 to be rotated slightly and through the action of the bevel gears 62, 63, 65 and 66, causes the shafts 47 and 48 to be rotated so that the elevator chains 43 and 44 raise the elevator and the stack of cartons. A pawl 81 mounted on a cross-shaft 82 journalled in suitable bearings on the frame pieces 53', 54', engages with the under side of the ratchet 69, and through the action of the pawl 81 the shaft 64 is held against a return movement as the arm 67 is returned to its original position for the pawl 68 to engage with another tooth on ratchet 69.

The upward feed of the elevator is controlled by the action of the detector finger 61 through the following mechanism.

The detector finger 61, which engages the shaft 58, is pivotally mounted on a yoke 83 at the pivot point 84. One end of this yoke is provided with a spring 85 bearing against the detector finger adjacent the forward end thereof, and the other end of said yoke 83 is provided with an adjusting screw 86 which bears against the rear end of the detector finger. The yoke 83 is mounted on a sleeve 87 (Fig. 3ª), this sleeve being loosely mounted on shaft 82. The other end of the sleeve 87 carries an arm 88, the forward end of which is provided with a pin 89 that bears against the under side of a lever 90. The lever 90 is loosely mounted on the stud 72. The other end of the lever 90 terminates in a hook 90' which is adapted to engage with a pin 91. The pin 91 is mounted in the lever 67 and is engaged by the hook end of lever 90 when the arm 67 has been rocked to raise the stack of blanks. When the pin 91 is engaged by the hook 90', the arm 67 is held against its return movement, which return movement is effected by a spring 92 (Figs. 3ª and 4) which tends to hold the cam roller 71' of the lever 71 against the cam 73 during its rotation to actuate the lever or arm 67 when the hook 90' is disengaged therefrom. When the stack of cartons has been raised to a predetermined height in engagement with the feed roller 57 so that the desired pressure between the feed roller 57 and the stack of blanks has been obtained, the detector finger 61 which rests on the feed roll shaft 58 is actuated thereby to rock the sleeve 87, swing the lever 88 on said sleeve, and through contact of the pin 89 with the lever 90 to raise the hook end 90' of the latter so that it will engage the pin 91 and hold the lever 67 against movement. The position of the top of the stack of cartons is determined by the pressure required between the feed roll 57 and the top of the stack for the successive and uniform feeding of the blanks therefrom. This position may be varied and adjusted under varying operating conditions by means of the adjusting screw 86 in the yoke 83.

A block 93 (Fig. 4) is adjustably mounted on the yoke 59 and is moved by means of an adjusting screw 94 carried by a bracket 59' secured to the yoke 59. The block 93 carries a separator plate 95 located directly beneath the feed roller 57. This separator plate 95 is adjusted with relation to the feed roller 57 so that it will allow the passage of the topmost carton through the space between the feed roll and the separator plate, but will not allow the passage of two cartons through the opening. The feed roller 57, as has been previously stated, is rotated intermittently and at the proper time to feed the topmost carton from the stack. The rotation of the feed roller is obtained in the following manner.

A gear 96 is mounted fast on the continuously rotating shaft 60 and meshes with a gear 97 mounted loose on shaft 58. Gear 97 carries a toothed clutch member 98. The gear 97 and the clutch member 98 are therefore constantly rotated by the driving action of the gear 96. A clutch sleeve 99 slidably mounted on shaft 58 carries a toothed clutch member 100 adapted to engage at the proper time with the clutch 98. The sleeve 99 is free to slide lengthwise on the shaft 58 and carries two diametrically opposite keys, one of which is shown at 101 (Fig. 4). These keys engage a driving disk 102 mounted fast on shaft 58. When the sleeve 99 is moved lengthwise of the shaft to engage the clutch 100 with the clutch 98, the clutch 100 is rotated, together with the sleeve 99, and through the engagement of the keys 101 with the disk 102 the shaft 58 and the feed roller 57 are caused to rotate. The sleeve 99 is provided with a yoke 103 loosely mounted on the sleeve. The yoke 103 is engaged by the fork end of a pivotally mounted lever 104 carried by a bracket or other suitable support (not shown). The lever 104 is attached to one end of a connecting rod 106, the other end of the connecting rod being connected to one arm of a bell-crank cam lever 107 pivoted at 108 to a stationary part of the machine. The other arm of the bell-crank lever 107 carries a roll 109 which bears against a cam 110 which is actuated to operate the clutch sleeve 99 at suitable times to drive the feed roller 57 and so feed the topmost blank from the stack. In order to insure that more than one blank will not be fed from the stack at the same time through the action of the feed roller 57, the roller 57 is rotated only a sufficient amount to partially withdraw the topmost carton blank from the stack. Additional means are provided to withdraw the blank completely from the stack after the rotation of the feed roller 57 has stopped. This means is preferably constructed as follows.

Mounted in suitable bearings on the frame pieces 53' and 54' is a shaft 111 (Fig. 4) which carries two arms 112 mounted fast thereon. The outer ends of the arms 112 are provided with bearings for a shaft 113. Shaft 113 carries two rollers 114. Directly beneath the shaft 113 is a shaft 115 also carried in bearings in the frame pieces 53' and 54'. Shaft 115 carries a spiral pinion 116 which meshes with a spiral gear 117 carried on the continuously driven time shaft 74. Through the action of these two spiral gears the shaft 115 is constantly rotated. Shaft 115 also carries a spur gear 118 that is adapted to mesh with a spur gear 119 mounted on the shaft 113 and through the action of these spur gears the shaft 113 is intermittently driven from the shaft 115. The shaft 115 is further provided with rollers 120 located directly beneath the rollers 114 on the shaft 113. The shaft 111 is provided at its outer end with a cam lever 121 which carries a roller 122 that bears against a cam 123 mounted on the time shaft 74. When the roller 122 rides off the high part of the cam 123, the shaft 111 is rocked slightly so that the rolls 114 are lifted and held out of engagement with the rolls 120 by the spring 124. After the feed roll 57 has partially withdrawn the topmost blank from the stack, the blank is advanced to a position between the rollers 114 and 120. When the rotation of the feed roll 57 ceases, the shaft 111 is rocked by the high part of the cam 123, and the shaft 113 and the arms 112 descend so that the rollers 114 are lowered and driven by gears 118, 119. The partially withdrawn blank is thus gripped between the rollers 114 and 120 which complete its withdrawal from the stack.

*Blank conveyor, feed roller brush, stop fingers, and side sealing flap bender. Figs. 1, 2, 3, 4, 4ª and 4ᵇ.*

Mounted on shaft 115 are tape pulleys 125 which carry tapes 126 adapted to receive the blank flatwise from roller 57 and convey the blank flatwise along the machine to grippers and a turning roll hereinafter described. A shaft 127, journalled in suitable bearings on the frame pieces 53' and 54', is provided with tape pulleys 128 located above the tape pulleys 125. The pulleys 128 are located directly in line with pulleys 125 and are provided with tapes 129. The tapes 126 and 129 also pass over pulleys 126' and 129' respectively, which are fixed on shafts 126'' and 129'' journalled in suitable bearings on the frame pieces 53' and 54'. The upper run of tapes 129 and the lower run of tapes 126 lie in contact with each other and the carton blank is fed between these tapes as it is advanced by the feed rollers 114 and 120. The continuously driven shaft 115 is provided with a sprocket 130. Mounted loose on rock shaft 111 is a gear 131 and a sprocket 132. The gear 131 and the sprocket 132 are fastened together and the sprockets 130 and 132 are connected by a driving chain 132'. The gear 131 meshes with a gear 133 mounted fast on the shaft 127. The shaft 127 is therefore driven continuously through the action of the sprockets 130 and 132 and the meshing of the gears 131 and 133.

It has been found that the rubber roll 57 becomes coated with fibers and dust from the feeding of the blanks, which tends to reduce the friction of the surface of the roller and to impair the feeding action. A brush is provided which is continuously driven and which bears lightly against the driven surface of the rubber roll and keeps the roll free from these particles of paper. This brush is indicated at 134 (Figs. 1, 3 and 4) and is mounted on a shaft 135 carried in suitable bearings on the frame pieces 53' and 54'. The shaft 135 is provided with a sprocket wheel 136 (Fig. 3), and the shaft 127 carries a sprocket 137 (Fig. 4), and through a chain connection 137' from the sprocket 137 to the sprocket 136 the shaft 135 and the brush 134 are positively rotated.

After the blank has been fed from the stack and has been advanced forward between the feed tapes 126 and 129, it is carried forward into contact with fingers 138 (Figs. 2 and 4) which stop the movement of the blank at a first registering position in order to get it in timed relation with the machine. These stop fingers 138 are withdrawn from the front of the blank at the proper time to allow the tapes to advance the blank into a second registering position. The fingers 138 are mounted on rock shaft 139 carried in suitable bearings on the frame pieces 53' and 54'. The outer end of shaft 139 carries an arm 140, the upper end of which is attached to a connecting rod 141. The other end of this rod 141 is connected with a link 148 attached to the upper end of a cam lever 142 (Fig. 4ᵃ) which is pivoted at 142' on a stationary part of the machine and operated by a cam 143 mounted on shaft 74. Through the above connections the stop fingers 138 are moved to allow the carton blank to be fed forward through the action of the feed tapes into position to be engaged by stop fingers at the second registering position. The feed tapes and carton blank thereon may be further supported, as by guides (not shown) secured to the frame pieces 53' and 54' between the same. Stop fingers 145, at the second registering position, are mounted on a shaft 146 carried in bearings on frame pieces 53' and 54'. The outer end of the shaft 146 carries an arm 147, one extremity of which is attached to the link 148. The other end of the link 148 being attached to the upper end of the cam lever 142, and the shaft 146 and the fingers 145 are therefore operated from the cam 143 at the same time as the fingers 138.

After the carton blank has been fed into position against the stop fingers 145, the blank is moved sidewise to register the blank in the proper position for breaking up the side sealing flap C of the blank. This side registering mechanism employed may be of any suitable type, but is preferably constructed as follows: A register plate 149 (Figs. 4ᵃ and 4ᵇ) is carried on a bracket 150. The bracket 150 is mounted on a slide 151 carried in a bracket 152 on the frame piece 53" of the machine. The slide 151 is attached at 153 to one end of a connecting rod 154, the other end of which is attached to the upper arm of a cam lever 155. Cam lever 155 carries a cam roll 156 which engages with a cam 157 mounted on time shaft 74. After the carton blank has come to rest against the stop fingers 145, the cam 157 through the cam lever 155 and the connecting mechanism, moves the plate 149 to push the blank sidewise against a stop 158 and thereby position the blank in the proper relation in the machine. This stop 158 is carried by a yoke 158' that is adjustably secured at 158" on a bracket 158''' secured to the frame piece opposite that carrying the bracket 152.

After the blank has been registered at the second position, the side sealing flap C is turned into a position substantially at right angles to the body of the blank B. For this purpose a swinging jaw 159 is employed which engages the upper surface of the blank and holds the latter in position and also provides an edge over which the side sealing flap C is turned. This swinging jaw, which holds or clamps the blank in position against a stationary jaw 159' on yoke 158' while the glue flap is being turned up, is mounted on a shaft 160 carried by said yoke. Shaft 160 is rocked periodically by a cam 161 on shaft 74, a cam lever 162 engaging said cam, a rod 163 having one end connected with said lever, and an arm 164 fixed on shaft 160 and connected with the opposite end of said rod. When the blank has been clamped in this position, a breaking jaw 165 is swung up into engagement with the under surface of the side sealing flap C and bends the same sharply upward, the line of bend being provided by the edge of the clamping jaw 159 that engages the top of the blank. This breaking jaw is mounted on a rock shaft 166 journalled in suitable bearings on the yoke 158' and periodically rocked by a cam 167 on shaft 74, a roller engaging said cam and mounted on the lower end of a bell-crank lever 168, a rod 169 having one extremity connected with the other end of said bell-crank lever, and an arm 170 carried on shaft 166 and connected with the opposite extremity of rod 169.

When the side sealing flap C is turned over the clamping jaw 159 by the breaking jaw 165, said flap is turned over until it comes into contact with the upper surface of the clamping jaw. This action turns the side sealing flap at an angle considerably greater than ninety degrees in order to break the spring in the carton so that when the side sealing flap is released by the return movement of the breaking jaw, said flap will spring back to a position approximately at right angles to the main body of the carton blank B. Mounted on shaft 146 are two arms 171 which carry on their outer end rollers 172 located directly above a pair of the carrier tapes. After the side sealing flap has been bent over, and at the proper time in the operation of the machine, the shaft 146 is rocked to move the stop members 145 out of engagement with the front edge of the carton blank. To insure the positive movement of the carton blank when the stop fingers 145 are disengaged therefrom, the movement of the shaft 146 causes the rollers 172 to swing downward into contact with the surface of a pair of the upper tapes 129 to press the same firmly against the carton blank, thereby causing the tapes to positively grip the blank between them and insure that the carton blank will be carried forward by the tapes without any slippage between the tape and the blank.

*Blank gripping and turning mechanism, feeding rollers, and side sealing flap gluer with detector control therefor. Figs. 1, 2, 5, 6, 6ᵃ, 7, 11, 13 and 14.*

The carton blank is carried forward from the second registering position by the tapes 126, 129, to a position where it is engaged by gripper fingers on a continuously revolving blank turning roll or series of rolls which change the direction of travel of the blank from a horizontal path to a vertical path.

A shaft 173, journaled in suitable bearings on the frame pieces 53", is provided with a plurality of rolls 174 and a plurality of rolls 175 on which are mounted the gripping mechanism for carrying the blank around the turning roll or rolls. The rolls 174 are provided with bearings which carry a shaft 176. The rolls 175 each have a cutout portion in their periphery to allow the free movement of fingers 177 mounted on shaft 176. The rolls 175 are further provided with stop members 178 against which the blank strikes in its forward travel to aid in registering the blank with the gripper fingers 177. Shaft 176 on its outer end is provided with a tumbler cam 179 which operates the fingers 177 to turn them into and out of engagement with the blank. As the blank is advanced toward the turning roll structure by the carrying tapes, the forward edge strikes the stops 178, the blank turning rolls being approximately in the position shown in Fig. 5 and rotating in the direction of the arrows. A roll 180, which is carried on a stationary part of the machine, then engages one end of the tumbler cam 179 and turns the gripper fingers 177 in a clock-wise direction over onto the carton blank to grip the blank between the fingers and the surface of the rolls 175. The fingers 177 are held under spring tension against the blank by means of the spring 181 which is a deadbeat spring that holds these fingers either in gripping position or in released position under the action of the spring. The gripping fingers 177 and the tumbler cam 179 are carried around in a counter-clockwise direction with the rolls 174, 175 during rotation of the latter and the blank is turned up and released in the following manner.

After the blank has been gripped by the fingers 177, it is then turned by said fingers and the turning rolls from a substantially horizontal position to a substantially vertical position. During this movement of the blank, it is desirable that the same should not be bent or curled while turning with the rolls 174 and 175, as any bending of the blank will have a tendency to straighten out the side sealing flap C which has been bent up at right angles to the carton blank. In order that the carton blank may not be bent as it is swung over into a vertical position by the turning roll, fingers 182 are provided to raise the rear of the blank and to lift it as it is turned into vertical position. Fingers 182 are mounted on a shaft 183 which rocks in bearings in the rolls 174 and 175. The shaft 183 is provided at its outer end with a cam lever 184 which carries a roll 185 that engages with the outer surface of a cam 186. Cam 186 is mounted loosely on the shaft 173 and is held from rotating with said shaft by a clamp stud 187 which holds the cam against a stationary part of the framework of the machine. The cam roller 185 is held in contact with a cam 186 through the action of a spring 188, one end of this spring being attached to a stud 188' on the cam lever 184, which stud passes through a slot 188'' in a gear 189. The other end of the spring 188 is attached to a spring stud 188''' on the turning rolls. The gear 189 is carried by shaft 173 and is of the same diameter as the turning rolls. Mounted in suitable bearings on the frame of the machine is a rock shaft 190 carrying two arms 191 clamped fast on the shaft 190. The outer ends of the arms 191 are provided with bearings for a shaft 192. The shaft 192 carries two rolls 193 which bear against the turning rolls 174 and are held under spring tension to grip the carton blank between the rolls 174 and 193 after the blank has been turned into a vertical position. Shaft 192 is provided with a gear 194 which meshes with the gear 189 on shaft 173, thereby turning the rolls 174 and 193 together positively and at the same surface speed. The shaft 173 upon which the turning rolls are mounted is provided at one end with a bevel gear 196 which meshes with a bevel gear 197 mounted on the continuously driven shaft 74, thereby rotating the turning rolls one revolution for each cycle of operation of the machine.

After the blank has been seized between the rolls 174 and 193 and during continued rotation of the former in a counterclockwise direction, a roll 195 (Fig. 5), mounted on a stationary part of the machine, engages the end of the tumbler cam 179 opposite that engaged by roller 180 and turns said cam and the gripper fingers 177 in a clockwise direction to released or open position. The blank is then released from the grippers 177 and fed downward until it is engaged by means for feeding the blank to the carton conveyor, which means is preferably comprised by the following instrumentalities. Beneath the turning rolls 174, 175 and the rolls 193 are two sets of feeding rolls, the upper set between which the blank first passes being driven at the same surface speed as the turning rolls. The upper set of these feeding rolls is indicated at 198 and 199 (Fig. 6). Beneath these rolls 198 and 199 is the lower or second set of feeding rolls which are driven at a somewhat higher speed in order to feed the blank rapidly to a position in front of the carton form. The second set of feeding rolls is indicated at 200 and 201. The rolls 198 are carried on a shaft 202 mounted in suitable bearings on the frame of the machine and are driven by means of a sprocket 203 mounted on the shaft 202, a sprocket 204 mounted on the turning roll shaft 173, and a sprocket chain 205 which passes around the sprockets 203 and 204. The rolls 200 are carried on a shaft 206 mounted in suitable bearings on the machine framework and driven through a sprocket 207 mounted on shaft 206, a sprocket 208 mounted on the shaft 202, and a chain 209 which passes around the sprockets 207 and 208. The rolls 199, which bear against the rolls 198, are carried on a shaft 210 that is journalled in the upwardly extending arms of bell-cranks 211 mounted loosely on a shaft 212. Suitable springs 213 bearing against the rearwardly extending arms of bell-cranks 211, press the rolls 199 yieldingly against the rolls 198. The rolls 201 are mounted on a shaft 214 journaled in the lower ends of arms 215 clamped on the shaft 212. The shaft 212 is provided with a lever 216, the outer end of which is attached to the lower end of a connecting rod 217. The upper end of the connecting rod 217 is attached to a lever 218 fixed on a rock shaft 219. Fixed on rock shaft 219 is a lever 220 carrying a roll 221 at its outer end which bears against a cam 222 mounted on shaft 173. The roll 221 is held against the cam 222 by a spring 223 attached to the arm 216 and to the framework of the machine. The rolls 201 are held out of contact with the rolls 200 through the action of the cam 222 and the intermediate connections until the blank has been fed downward between said rolls and until the rear edge of the blank is about to pass out of engagement with the rolls 199 and 198. At this point in the operation of the machine, through the action of the cam 222 against the roll 221, the shaft 212 is rocked to allow the rolls 201 to move into engagement with the blank under the action of the spring 223 and thereby grip the blank firmly between the rolls 200 and 201 and feed the blank downward. The shafts 206 and 214 are rotated together by means of a pair of gears 224 and 225, respectively when the rolls 200 and 201 are brought together to feed the blank. The shafts 210 and 202 are rotated together positively by means of gears 226 and 227 mounted on said shafts.

The rolls 200 and 201 do not engage the carton blank to feed it at the increased rate of travel until the side sealing flap C has been completely glued and has passed out of contact with the gluing mechanism to be presently described. The feeding rolls 200 and 201 are driven at a much higher rate of speed, approximately three times the speed of rotation of the gluing mechanism, and if the carton blank were seized by the feed rolls 200 and 201 before the gluing operation was completed and the side sealing flap had passed out of contact with the gluing mechanism, the carton blank would be fed through said mechanism which would spread glue on the blank, tend to deform the same, and swing said blank out of position in the machine. Accordingly, the carton blank, while being fed in its downward travel and while engaged with the low speed rolls 198 and 199, is passed through gluing mechanism of the present invention which avoids the disadvantages above referred to and applies a strip of adhesive to the outer surface of the turned up side sealing flap C. This gluing mechanism is preferably comprised by the following instrumentalities.

Carried in suitable bearings on the machine framework and disposed adjacent the rolls 198, 199, is a horizontal shaft 228 (Fig. 6) which carries at one end a glue roll 229. This glue roll 229 runs in a glue pot 230 and is provided with a scraper 231 to control the amount of glue on the glue roll 229. The shaft 228 is provided with a sprocket 232 around which passes a sprocket chain 233 driven from a sprocket 234 mounted on the continuously revolving time shaft 74. The glue roller 229 is therefore rotated while the machine is operating and stops its rotation whenever the clutch hereinafter described is disengaged and the machine is stopped. It is preferred that this gluing roller shall be driven only when the machine is running and shall be stopped when the machine is stopped. Inasmuch as the machine may be stopped by hand while a carton blank is passing between the rollers 198 and 199 and while the blank is in contact with the gluing rolls, if the glue roll does not stop when the machine is stopped the continued rotation of the glue roll while in contact with the side sealing flap would tend to throw the blank out of position in the machine.

Mounted on a shaft 235 is a rubber covered glue roll 236 which turns in contact with the glue roller 229 and is driven therewith through a gear 237 mounted on shaft 228, which gear engages with a gear 238 mounted on shaft 235. A pressure roll 239 is carried on a shaft 240 mounted on the upper end of an arm 241 pivoted at 242 in the glue roll bracket. Shaft 240 is provided with a gear 243 which meshes with gear 238 on shaft 235 thereby driving the roll 239 at the same speed as the roll 236. The arm 241 is moved to the left as viewed in Fig. 6 through the action of a connecting rod 244 attached to the upper end of the arm 241, the other end of the connecting rod being attached to a bell-crank lever 245. The lever 245 carries a roll 246 which bears against a cam 247 on shaft 74. Movement to the left of arm 241 carries the roll 239 thereon away from the roll 236. The roll 239 is urged toward the glue roll 236 through the action of a spring 248 (Fig. 6ª). It is desirable to hold the pressure roll 239 out of contact with the glue roll 236 unless there is a carton blank present to receive a stripe of glue from the glue roll 236. Means are therefore preferably provided whereby, if a carton blank is not present between the feeding rollers 198 and 199, the arm 241 with the pressure roll 239 is held in an outward position against the action of the spring 248. This means is preferably comprised by the following instrumentalities.

Mounted on the arm 241 is a finger 249 (Fig. 6ª) which is fixed on one end of a shaft 250 journalled on said arm, the other end of the shaft 250 being provided with a detector finger 251 which projects into the downward path of travel of the carton blank. The lower end of the finger 249, in its normal position is adapted to engage the end of a pin 252 carried in a stationary part of the glue roll bracket. When the finger 249 engages the end of the pin 252, it holds the arm 241 in its outward position against the action of the spring 248. When the carton blank is fed into position to receive a stripe of glue on the side sealing flap, the advancing edge of the carton blank strikes the detector finger 251 and swings the finger 249 out of engagement with the pin 252. Under these conditions, when the roll 246 rides off the high part of the cam 247, the arm 241 is allowed to rock and swing the roller 239 into contact with the side sealing flap C of the blank, which flap is then pressed by the roller 239 firmly against the glue roll 236. The cam 247 is shaped so that the pressure roll 239 is moved into engagement with the blank just as the side sealing flap passes between the glue roll 236 and said pressure roll and the cam moves the pressure roll out of contact with the side sealing flap just before it passes out of engagement between the glue roll and the pressure roll. This insures that there will be no glue deposited on the pressure roll, as any glue on this roll would be deposited on the inside of the side sealing flap where it would cause the carton to stick on the carton form and interfere with the proper operation of the machine.

A guide 253 is provided which is carried by the arm 241 to guide the carton properly past the glue rolls. Guides 254 are also provided to aid in guiding the carton in its passage through the feeding rollers 198, 199 and 200, 201.

*Blank registering mechanism, and front and side panel folders. Figs. 7, 8, 9, 10 and 15.*

As the carton blank is fed downwardly by the rollers 200, 201, it moves into the path of travel of one of the moving carton forms or blocks D where it is positioned and registered with the carton form in front of the same, to be thereafter folded and sealed about said form. After the carton blank leaves the rollers 200, 201, it is deposited in vertical position on supports 255 and 256. The supports 255, 256 are carried on vertically reciprocable slides and are moved upward to register the carton in its final position with respect to the moving form. At the time the carton is delivered onto the supports, the latter are in their lowermost position and the blank is fed downward to a position below its final position in register with the forming block.

The supports 255 and 256 are carried on slides 257 which are movable in suitable guides on stationary parts of the machine. These stationary parts are preferably comprised by spaced guide plates 279 on which the slides 257 are mounted forwardly thereof. The slides 257 are moved upwardly by connecting rods 258, the lower ends of which are connected to arms 259 mounted on a rock shaft 260. Rock shaft 260 is provided with a cam lever 261 carrying a roller 262 which engages in the path of a cam 263. Cam 263 is mounted on a shaft 264 (Fig. 15) which is continuously rotated through suitable driving connections from the main driving shaft of the machine. This shaft 264 makes one complete revolution with each cycle of operation of the machine.

The shaft 264 is provided with a sprocket 265 and through a sprocket chain 265' is driven from a sprocket 266 carried on a shaft 267, which shaft 267 also carries a sprocket 268 that is driven through a sprocket chain 268' from the main carrier chain shaft 269 (Figs. 1, 2 and 16) on which is mounted a sprocket 270 around which the sprocket chain 268' passes.

At the same time that the blank is registered by the vertically moving plates 255 and 256, it is also registered sidewise by suitable mechanism, preferably constructed as follows. A pusher plate 271 is carried on a slide 272 which travels in a suitable guide on the front of one of the plates 279 that carry the slides 277. The slide 272 is provided on its rear face with an angular slot 273. A connecting rod 274 is provided with a flattened portion which lies against the rear face of the slide 272 and carries a tongue 275 which engages the slot 273 in the rear face of the slide 272. The lower end of the connecting rod 274 is connected at 274' with one of the rods 258 which operate the vertical slides 257. When the slides 257 are moved vertically through the action of the cam 263, the slide 272, by engagement of the tongue 275 with the slot 273, is moved toward the left as viewed in Fig. 7, and the pusher plate 271 is moved to push the carton blank against the stops 276. Fingers 277 are provided which are carried on brackets 278. The fingers 277 are located at the upper edge of the carton blank and serve to check any excessive rebound of the blank as it strikes the plates 255 and 256, and also to aid in positioning the blank on the upward movement of the register plates or supports 255, 256. The fingers 277 are held in yielding engagement with guide plates 279 by means of springs 280.

After the carton blank has been properly registered by the mechanism just described, one of the advancing carton forms D engages the blank so that the front and side panels of the carton are folded about the carton form by rollers 281 between which said form passes. These rollers 281 may be supported in any desired manner, but as herein shown the same are mounted loosely on pins 282 carried in brackets 283 supported on the rear faces of guide plates 279. The rolls 281 are adjustably mounted as clearly shown in Fig. 7, and are spaced apart a sufficient distance to enable the carton form with the blank wrapped thereon to pass between them. The rolls 281 are preferably covered with rubber or some yielding material so that they will hold the carton blank against the form with a yielding pressure. As above stated, these rollers 281 operate to fold the front and side panels of the carton against the carton form.

When the carton form passes between the rollers 281, the blank is wrapped about the form along its front face and two side faces, with the side sealing flap C extending around the rear corner of the forming block and lying substantially parallel with the rear face of the form. The form then passes between the usual side rails or guides M, M (Figs. 1 and 16) which act to hold the blank in proper position on the form. The rear panel of the carton at this time extends rearwardly of the form in a straight line substantially parallel to one side face of the form and ready to be folded down against the rear face of the form and the side sealing flap to complete the folding or wrapping of the carton blank into its tubular form.

*Rear panel folder. Figs. 15, 15ª, 15ᵇ and 15ᶜ.*

The folding and wrapping of the carton blank about the forming block is accomplished while the carton form with the blank thereon is moving continuously and in consequence thereof the folding of the rear panel of the carton is preferably obtained with mechanism of the present invention that has movement transversely to the movement of the forming block and travels in a direction with the travel of the forming block in order to complete the folding and wrapping operation and retain the folded rear panel in proper position until a pressure mechanism hereinafter described has gripped the completely folded blank to retain it in position. This rear panel folding mechanism is preferably constructed as follows. A folding yoke 284 is provided with rollers 285 which engage the extending rear panel of the carton at a slight distance away from the corner of the forming block to fold the panel against the rear face of said block. The yoke 284 is pivotally mounted on a slide 286 carried in suitable guideways. Slide 286 is provided with rollers 287 which embrace a rod 288 carried by the upper ends of two arms 289 and 290. The arm 290 is a bell-crank lever, one arm 290' of which is attached to a connecting rod 291, the lower end of the connecting rod being attached to a cam lever 292 which carries a roller 293 that engages with a cam 294 on shaft 264. The arms 289 and 290 are mounted fast on shaft 295. When the shaft 295 is rocked through the action of the cam 294 and its intermediate connections, the arm 290' of the bell-crank 290 is rocked to the right as viewed in Fig. 15ª, carrying the rod 288 toward the right and, through contact with the rolls 287, causing the slide 286 to be moved and the folder yoke 284 to move forward into the path of the forming block and fold the rear panel of the carton. The folder yoke 284 is provided with an arm 296, the free end of which is attached to one end of a connecting rod 297, the other end of the connecting rod being attached to the guide which carries the slide 286. As the folder yoke 284 is moved through its folding operation, it is moved forward substantially at right angles to the travel of the carrier form through the action of the cam 294. During this movement, the folder yoke 284 is given a swinging movement in line with the travel of the forming block through the action of the connecting rod 297 on the arm 296 attached to the folder yoke.

This mechanism is mounted on a carriage 298 which reciprocates in a direction parallel to the travel of the carton form. The carriage 298 is slidably mounted on rods 299 and 300 which serve to guide said carriage in its forward and rearward movement. The carriage 298 carries on the under side thereof a sliding member 301 which is held in a suitable guideway in the carriage 298 and is capable of movement in the latter in a direction transversely of the machine or substantially at right angles to the line of travel of the forming block. Slide 301 carries a stud 302 which engages with a driving block 303 mounted on a chain 304. The chain 304 is carried about a sprocket 305 mounted fast on a shaft 306. The chain 304 also passes around a sprocket 307 which is loosely mounted on a stud 308. The shaft 306 carries a sprocket 309 which is driven through a sprocket chain 309' from a sprocket 310 mounted on a shaft 311. The lower end of shaft 311 carries a bevel gear 312 which meshes with a bevel gear 313 on the shaft 264, thus driving the sprocket 305 and the chain 304 continuously. The chain 305 through the intermediate mechanism is driven so that the driving block 303 makes a complete travel around the sprockets 305, 307 during one cycle of operation of the machine. The length of the chain 304 is also made the same as the distance from center to center of adjacent pairs of forming blocks D. Consequently, the speed of travel of the chain 304 is identical with the linear speed of travel of the carton form, so that during the time that the driving block 303 is traveling from one sprocket to the other in a straight line it drives the folder at exactly the same speed as the travel of the carton form and maintains the pressure of the folder rolls 285 against the rear face of the forming block the same throughout the entire travel of the folder.

It is desirable, when the rear panel of the carton is folded around the form, to have the folding rolls 285 strike the panel at some distance from the corner of the form. The reason for this is that the panel should be broken along the score line of the carton, and it has been found that, if the folding roll strikes along the corner of the block, there is a tendency to break the carton along a line other than the score line where the proper fold is made. The fact that the rollers 285 are thus caused to engage the rear panel at a certain distance from the corner makes it desirable to provide means for causing the rollers to catch up with the form in order to hold the rear panel of the carton against the same, and accordingly this speeding up of the rollers 285 is effected by the pivotal mounting of the same and the connections 296 and 297 which cause the rollers to overtake the form promptly after they have engaged said rear panel.

*Side sealing flap press mechanism. Figs. 15, 16 17, 18 and 19.*

After the rear panel of the carton has been folded down over the side sealing flap C, it is desirable to apply pressure on said flap in order to quickly seal the side seam adjacent the corner of the carton and to cause the rear panel and the side sealing flap to unite properly along the glued surface of the latter. In accordance with the present invention, press mechanism is provided for this purpose, and said press mechanism is preferably constructed as follows. The press mechanism is provided with forward and rear jaws 314 and 315, respectively. The press jaw 315 is provided with a pressure plate 316 held thereon by studs, and between the press jaw 315 and the plate 316 is interposed a cushion 317, preferably of rubber, to provide yielding of the plate 316 as the press jaws are clamped to the form carrying the carton. The press jaws 314 and 315 are pivoted on studs 318 and 319 on the press frame and are provided with arms 320 and 321. The outer ends of the arms 320 and 321 are connected by toggle links 322, 323, respectively. These toggle links are so arranged that when they are in the straightened position the press jaws 314 and 315 will be clamped securely on the carton form and will press the rear panel of the carton firmly against the side sealing flap. The inner ends of the toggle arms 322 and 323 are pivotally connected by a pin 324. The pin 324 carries two rollers 325 and 326. The roller 325 extends through a slot in a yoke 327 and, as the press reciprocates forward and back, the roll 325 travels in the slot in the arm 327. The yoke arm 327 is pivoted at one end to one arm 328' of a bell-crank 328 (Figs. 15 and 17) and has a sliding connection at its other end with one arm 329' of a bell-crank 329. The other arm 328'' of bell-crank 328 is connected to one extremity of a rod 330, the opposite extremity of which is connected to the other arm 329'' of a bell-crank 329. The bell-crank 328 is fixed on a shaft 331 journalled in suitable bearings on the press, and said shaft carries an arm 331' on which is mounted a roller 331'' that engages a cam 332 mounted on shaft 267. During the rotation of the shaft 267 and the cam 332, the arm 331' and bell-crank lever 328 are rocked and through the connecting mechanism the bell-crank lever 329 is also rocked to move the yoke 327 bodily toward the right as viewed in Fig. 17 and through the contact with the roll 325 on the pin 324 cause the toggle arms 322, 323 to move, whereby the toggle is broken and the press jaws 314 and 315 opened to release the pressure of the same on the forming block.

The studs 318 and 319 are carried in a bracket 333 of the press frame, which bracket is mounted on a slide 334 that is carried on a carriage or saddle 335 mounted on a bracket 336 secured to the framework of the machine. The slide 334 is moved on the saddle 335 in a direction lengthwise of the machine or in a direction parallel with the travel of the carton form. The carriage or saddle 335 is slidably mounted on the bracket 336 and travels in a direction at right angles to the direction of movement of the slide 334. Thus the press jaws 314, 315 have a movement in one direction toward and away from the carton form with the carriage or saddle 335 and a movement with the form by the slide 334. Mounted on the saddle 335 is a cam roller 337 which engages with a cam 338 mounted on the shaft 267 and through the rotation of the cam 338 the carriage or saddle is moved toward and away from the forming block to give the press jaws their gripping and releasing movements. The slide 334 carries a stud 339 to which one end of a connecting rod 340 is attached through an intermediate link 339'. The other end of the connecting rod 340 is attached to the upper end of a cam lever 341 (Fig. 16). Lever 341 carries a roller 342 that engages with a cam 343 on shaft 269 and through the rotation of the cam 343 and the connecting mechanism, the slide 334 is given a reciprocating movement along the carriage or saddle 335 in the direction of travel of the carton form.

In the operation of the press mechanism, the press jaws in their open position are moved toward the carton form through the action of the cam 338 and the movement of the saddle 335 until the press jaws have embraced the carton form near the corners. Upon the completion of this inward movement of the press, the cam 332 acting on the arm 331', bell-crank 328, and connecting mechanism, moves the yoke 327 to the left as viewed in Fig. 17, thereby straightening the toggle arms 322 and 323 and closing the press jaws firmly against the carton form and carton thereon. During this movement of the press mechanism, the slide 334, through the action of the cam 343, is travelling in the direction of the form and at the same speed. As the slide 334 approaches the end of its travel, the cam 332 operates to move the yoke 327 in the reverse direction to open the toggle and release the press jaws, immediately after which the cam 338 moves the carriage or saddle 335 in the reverse direction and withdraws the press out of the path of the carton forms. Upon completion of this movement of the press, the cam 343 moves the slide 334 in the reverse direction and moves the press in the direction opposite to the travel of the form to its original position where it is ready to act on the following form and carton carried thereby.

As shown in Figs. 16 and 17, the roll 326 on the pin 324 extends into a slotted portion 334' of the slide 334 and serves to guide the toggle pin 334 in its movement under the action of the yoke 327 to control the proper movement of the press jaws and to maintain them in a central position as the press jaws are opened and closed.

In accordance with the present invention, means are provided, preferably carried by the press, for holding the partially folded carton against the carton form while the rear panel is being folded and the press jaws are coming into position to apply the pressure to the side sealing flap. Said means is preferably comprised by a pressure plate 344, which bears against the side of the carton form and is carried by two sets of rods 345 which are yoked together on their rear ends by connections 346. The rods 345 are guided by brackets 347 carried on the press frame 348. A spring 349, one end of which is attached to one of the connecting members 346 and the other end of which is attached to one of the guides 347, holds the pressure plate 344 under spring tension against the side of the forming block and retains the carton blank in proper position thereon. Stop collars 350 (Fig. 18) are provided on the rods 345 to limit the movement of the pressure plate 344 under the action of the spring 349 when the press jaws are withdrawn from their operating position.

*Carton conveying and sealing apparatus, driving mechanism, and blank guiding fingers. Figs. 1, 2, 3, 4, 4ª, 5, 12, 16, 20 and 21.*

After the blank has been folded and sealed into tubular form, the narrow end flaps E (Fig. 2) of the carton are then folded down on the top or end of the forming block by the usual kicker F and stationary folder G and the wide end flaps H are spread outwardly into a horizontal position. The kicker F is operated by the usual rod F' connected with one end of a lever F² pivoted at F³ on a stationary part of the machine. The lever F² carries at its lower end a roller F⁴ that engages a cam F⁵ fixed on shaft 269 (Fig. 16). The continued travel of the carton form brings the extending side flaps H into contact with the under side of the two glue rollers I (Figs. 1, 2, 20 and 21) that apply a coating of adhesive to the surface of the extended flaps. The carton form, together with the carton, then passes around the forward end of the machine, a guide being provided to retain the narrow end folded flaps against the end of the form, and the carton form then passes to the under side of the machine and travels in a straight line beneath the conveyor raceway. As the carton form starts its straight line travel folders K (Figs. 1 and 2), of any suitable construction, fold the wide flaps H over against the end of the form to complete the folding of the end of the carton. The folded and glued flaps are then held firmly against the end of the carton form by a pressure belt 350ª as the carton form moves toward the front of the machine. The upper reach of the belt 350ª is supported on rollers 350ᵇ journalled on the side frames 53''', and said belt passes around pulleys 350ᶜ and 350ᵈ, the shafts of which are carried in suitable bearings on said side frames. The shaft for the pulley 350ᶜ also carries a pulley 350ᵉ around which passes a belt 350ᶠ, said belt also passing around a pulley 350ᵍ on shaft 267 which thus serves to drive belt 350ª. As the carton form reaches the end of its lower travel and leaves the pressure belt 350ª, the form with the carton completely sealed on its bottom is swung upward around the carrier sprockets 367ᶜ into a vertical position and into the path of the upper travel and the carton is removed from the form by compressed air through a conduit L, or any other suitable means for this purpose.

The driving mechanism for the machine is preferably comprised by the following instrumentalities. A shaft 351 (Figs. 1, 16 and 20) mounted in suitable bearings on the frame of the machine is provided with a pulley 352 which may be driven from any suitable source of power, 352ª, through a belt 352ᵇ that passes around a pulley 352ᶜ on a shaft 352ᵈ journaled in suitable bearings on the side frames 53'''. The shaft 352ᵈ carries a pulley 352ᵉ around which passes a belt 352ᶠ that also passes around the pulley 352 and thereby drives the shaft 351. Mounted fast on shaft 351 is a gear 353 which engages a gear 354 on a shaft 355 journalled in suitable bearings on the side frame 53'''. Shaft 355 carries the glue rolls I that apply the adhesive to the end sealing flaps of the carton, as shown in Fig. 2, and is continuously driven.

Mounted loosely on shaft 351 is a clutch drum 357 of any suitable construction which carries a pinion gear 358 (Fig. 20). A clutch ring 359, mounted fast on shaft 351, is adapted to be frictionally engaged through the action of a clutch lever 360 to drive the clutch drum 357 and pinion 358 with the shaft 351. The pinion 358 engages a gear 361 mounted on shaft 362. Mounted on shaft 362 is a gear 363 which engages a gear 364 mounted loosely on shaft 351. Fast on the hub of the gear 364 is a sprocket 365 around which passes a sprocket chain 366' which drives the sprocket 367 (Fig. 16) mounted fast on shaft 269. The shaft 269 is the main driving shaft from which the carton sealing mechanism is driven and is the shaft carrying the sprockets 367ª around which pass the conveyor chains 367ᵇ that carry the forms D. The chains 367ᵇ also pass around sprockets 367ᶜ (Figs. 1 and 2) carried on a shaft 367ᵈ journalled in suitable bearings on the side frames 53'''. The outer end of shaft 362 carries a sprocket 368 (Figs. 1 and 20) adjustably secured to a disk 369 fixed on the shaft 362. A sprocket chain 370 (Fig. 20), which passes around the sprocket 368, also passes around a sprocket 371 (Figs. 1 and 3) mounted on the shaft 60 of the blank feeding mechanism and thus serves to drive the carton blank feeding and transferring mechanism. The two sprockets 365 and 368 are driven continuously when the clutch parts 357 and 359 are engaged, and these sprockets remain stationary when the clutch is disengaged so that, in the operation, the carton conveying and sealing mechanism and the carton blank feeding and transferring mechanism are driven in unison and the operation is controlled by the engagement and disengagement of said clutch. Through the driving arrangement of the three shafts just described, the glue rolls I are rotated continuously whether the clutch parts 357 and 359 are engaged or disengaged so long as power is continuously applied to the driving pulley 352. The adjustable mounting of the sprocket wheel 368 on the shaft 362 provides for adjustment of the former in order to time all of the blank feeding and registering mechanisms accurately with the carton folding, pressing, sealing and conveying mechanisms. The adjustment is effected by slots in the disk 369 through which the sprocket 368 is clamped to the driving disk 369 by bolts or other suitable fastening means (Fig. 20).

When stopping the operation of the machine, it is desirable to first stop the feed of blanks from the stack and to allow further operation of the blank transferring mechanism and the folding and sealing mechanism to complete the folding and sealing of the various blanks that are in process through the machine. This stopping of the blank feed is preferably effected in the following manner. Mounted on a stud 372 on the rocking yoke 59 is an arm 373 (Fig. 4) which is adapted to be swung into engagement with the front face of the clutch lever 104 which operates the clutch for starting and stopping the feed roller 57. A connecting rod 374 is attached at one end to the arm 373, the other end of which is attached to an arm 375 mounted on a shaft 376 journaled in suitable bearings on the machine framework. A lever 377 is mounted on shaft 376 by means of which the shaft 376 may be rocked manually when so desired. An arm 378 (Fig. 4ª) is mounted on shaft 376 and provided with a notch 379 with which a spring 380 engages in one position of the shaft 376. In the normal operation of the machine, the arm 373 is swung forward so that the upper end does not engage the lever 104, and the lever 104 is allowed to move freely under the action of the spring 381. When it is desired to stop the operation of the feed of blanks from the stack, the shaft 376 is rocked by hand and through the connecting mechanism, the arm 373 is moved into a position for its upper end to engage the face of the clutch lever 104 and hold the lever 104 and the clutch part 100 disengaged from the clutch part 98 against the action of the spring 381. Disengagement of the clutch 98, 100 through the arm 373 stops the feeding action of the roller 57 and the further delivery of blanks to the blank transferring mechanism. Through this means the operation of feeding, gluing and folding of the successive blanks may be continued without the loss of any carton blanks which have been partially operated upon, as would be the case if some means were not provided to stop the feed of blanks from the stack into the machine.

In order to insure that the carton blank be fed into proper relation with the turning roll 174, 175 and the gripper fingers 177 carried thereon, means are provided to guide the carton into position to be seized by said gripper fingers. Said means are preferably comprised by a shaft 382 carried in suitable bearings and provided with fingers 383 which extend forward above the blank and to a position near the gripper fingers 177 (Figs. 5 and 12). Shaft 382 carries an arm 384 connected to a cam fork 385 which is carried loosely on the shaft 173. The fork 385 carries a roller 386 which engages with a cam 387 carried by shaft 173. A collar 388 is provided on the shaft 173 to retain the cam fork 385 in proper relation with the cam 387. After the carton blank has been seized by the gripper fingers 177, the cam 387, through the roller 386, moves the cam fork to rock the shaft 382 and raise the fingers 383 upward so that the carton blank swings upward freely without touching the fingers 383 as the blank is turned from its horizontal position into a vertical position by the action of the turning rolls. After the blank has passed into its vertical position, the fingers 383 are returned to their normal position where they are in position to guide the following carton blank into the gripping fingers 177 as the turning roll makes its next revolution.

*Operation.*

In the operation of the machine, the carton blanks B are supported in a vertical stack or pile by the automatically operated elevator 40, and said blanks are fed laterally in succession flatwise from the top of the pile by the feed roller 57. As each blank is removed from the stack, it passes between the series of horizontally disposed upper and lower conveyor or carrier tapes 126, 129 which convey the blank horizontally and flatwise from the elevator and feeder 40, 57 to the fingers 138. These carrier tapes are continuously driven and upon arrival of the blank at the fingers 138, the blank is momentarily stopped at the first registering position by said fingers which thereafter release the blank at the proper time in relation to succeeding operations in the machine.

The blank, after being released by the stop fingers 138, is carried by the tapes 126, 129 to the second registering position where it is stopped by the fingers 145. At this second registering position, the blank is side registered with respect to the flap bender 165 and the turning roll 174, 175 by the plate 149, whereupon the side sealing flap C is bent or turned up at right angles to the body of the carton blank by the flap bender 165 while the blank is stationary. This turning up of the side sealing flap breaks the score line of the blank sufficiently so that the side sealing flap remains substantially at right angles to the body of the blank throughout the remainder of its travel through the machine. After this operation, the stop fingers at the second registering position release the blank, and the blank is carried forward by the tapes until the front edge of the blank engages the stop members 178 and is seized by the gripper fingers 177 mounted on the turning roll 174, 175. The blank is then turned from the horizontal to the vertical by the turning roll and fed downward toward its final position in front of one of the forming blocks D on the carton conveyor.

Inasmuch as the type of feed used in the machine is preferably a friction feed, the topmost blank is not always withdrawn from the stack at a definite timed relation with the rest of the machine. For this reason the blank is stopped in the first registering position, and in this position it is timed with the remainder of the machine. The blank is released by the first stop fingers at a time to insure its reaching and being side registered at the second registering position before the side sealing flap is turned up. The stop fingers at the second registering position release the blank at the proper time in the operation of the machine so that the forward edge of the blank will reach the grippers 177 on the turning roll and be seized thereon in proper position.

After the blank has been turned into a vertical position, it is fed downward by the feed rollers 198, 199 which grip the blank and feed it in the direction stated. During vertical travel of the blank through these feed rollers 198, 199, a stripe of adhesive is applied to the outside surface of the extending, bent, side sealing flap by the rollers 236, 239 disposed adjacent said feeding rollers. After the carton has passed the glue and pressure rollers 236, 239 and the side sealing flap has passed out of contact therewith, the blank is seized between the feed rollers 200, 201 which are running at a somewhat higher speed than the travel of the blank up to this point. These latter feed rollers feed the blank downward to a position directly in the path of one of the forming blocks on the carton conveyor. The purpose of feed rollers 200, 201 (which travel at a comparatively high rate of speed with respect to the speed of the feed rollers 198, 199, that deliver the blanks to the glue and pressure rollers) is the same as that of the feed rollers disclosed in my application Serial No. 32.410, filed May 23, 1925, which insure that the blank is positioned in time at the front of the forming block.

The blank, after being released from the feeding rollers, is delivered onto the supports 255, 256, in a position directly in front of one of the moving forming blocks D, in which position the blank is moved or side registered both vertically and horizontally with respect to one of the forming blocks D by the supports 255, 256 and the plate 271 to insure that the blank may be properly positioned at the proper height in relation to the forming block and to insure that the score lines of the blank may register with the corners of said block. In delivering the blank in front of a conveyor form at a relatively high speed, there is a tendency for the blank to rebound should the lower edge strike a stationary blank support. In accordance with the present invention, the blank is allowed to travel beyond its desired position and thereafter return to the registered position through the action of the movable supports 255, 256 and the mechanism previously described for operating the same. This reduces to a minimum the effects of rebound and it has been found more satisfactory to allow the blank to travel beyond the registering position and thereafter return the blank to said position, than to stop the blank in the proper position or, after the blank has been stopped, to attempt to move it in the same direction as its former travel. At the time that the blank is registered vertically and sidewise, the vertical panels of the carton are brought in proper relation to the forming block.

Immediately after the blank has been finally registered, it is engaged by the forward face of the forming block and the front and side panels are folded about the block on three sides thereof through the action of the stationary folding rollers 281 that are located a proper distance apart and between which the carton form passes with three sides of the blank wrapped thereon. The carton is maintained in its proper position on the forming block by the action of side rails or guides M, M which hold the carton blank against the forming block and maintain the carton in its proper position until the completion of all the folding operations. At this time the side sealing flap C, which extends at right angles to the adjacent panel of the carton, projects around the rear corner of the forming block and lies approximately against its rear face. This positioning of the glued side sealing flap results from the breaking over of said flap at right angles to the body of the carton and therefore no folding mechanism is required to turn the side sealing flap around against the rear face of the forming block.

The fourth or rear panel of the carton at this time extends rearwardly behind the forming block in a plane with the adjacent side of the forming block and in a general direction of the travel of the form. In the subsequent travel of the forming block, this panel is turned inwardly against the rear face of the forming block and affixed on the side sealing flap C by the rollers 285 carried on a folding arm 284, which rollers contact with the fourth or rear panel to fold it into position and travel a slight distance across the rear face of the forming block after the panel has been completely folded. This travel is such as to bring the folding rollers 285 well over towards the side sealing flap in order to insure that the fourth or rear panel shall be folded against and properly affixed on the side sealing flap C. At this time, and while the folding rollers 285 are holding the rear panel firmly against the rear face of the forming block, the reciprocating pressure applying device 314, 315 is operated to firmly grip the folded carton blank on the forming block, said device gripping the blank on the front face or panel, and on the rear face or panel directly over the side sealing flap. The pressure applying device is moved forward with the forming block and at the same speed as the travel of the forming block, for a distance approximately half the distance between two adjacent forms. During this time pressure is maintained to insure the proper adhesion between the rear panel and the side sealing flap, and the pressure plate 344 is held against one side face of the forming block under spring tension to insure that the side panel of the carton and the side sealing flap are held in contact and in the proper position with the forming block until the press has applied the pressure to the side sealing flap. The press is thereafter released and is withdrawn from contact with the form and returns to a position where it engages with the next form. From this point, the operation of the machine is the same as previously described or shown in the patent to Johnson, No. 1,096,918.

It is to be expressly understood that, while this invention has been described particularly with reference to mechanism for making cartons, the invention is adapted also for making liners, wrappers or other forms of containers. The expression "carton blank" herein employed is therefore to be construed broadly enough to include blanks for these and other forms of containers as well as for cartons. Moreover, while one expression of the inventive idea is herein described and illustrated in detail, it is to be expressly understood that the invention is not limited thereto but may be embodied in various mechanical expressions within the limits of the appended claims.

What is claimed is:

1. In a carton making machine, the combination with an endless conveyor and a form thereon, of endless means carrying a blank flatwise thereon and extending in spaced substantially parallel relation with said conveyor, means for feeding the blank flatwise onto the endless carrying means, and means for transferring the blank from said carrying means angularly thereto whereby said blank may be positioned for wrapping or folding around said form.

2. In a carton making machine, the combination with an endless conveyor and a form thereon, of endless means carrying a blank flatwise thereon and arranged in spaced substantially parallel relation with said conveyor, and means receiving the blank from said endless carrying means and adapted to turn said blank angularly thereto whereby it may be fed across the path of travel of said form to be wrapped or folded therearound.

3. In a carton making machine, the combination with an endless conveyor and a form thereon, of endless means carrying a blank flatwise thereon and arranged in spaced relation with said conveyor, means for transferring the blank from the endless carrying means angularly thereto whereby said blank may be positioned for wrapping or folding around the form, means for driving the conveyor and the blank carrying means in opposite directions respectively, and means for wrapping or folding the blank around said form while it is traveling in a direction opposite to the direction of travel of the blank on said blank carrying means.

4. In a carton making machine, the combination with a horizontally arranged endless conveyor and means for wrapping or folding a blank around a form thereon, of endless blank carrying means arranged substantially parallel with said conveyor to receive the blank from a vertical stack at one end of the machine and transport the blank flatwise toward the opposite end of the machine, and means for transferring the blank from said endless carrying means angularly thereto whereby said blank may be positioned for wrapping or folding around said form by said first named means.

5. In a carton making machine, the combination with an endless conveyor and means for wrapping or folding a blank around a form thereon, of endless blank carrying means receiving the blank at one end of the machine and transporting said blank flatwise toward the opposite end of the machine, an intermittently driven roller adapted to feed the blank from a source of supply and deliver it flatwise onto said endless blank carrying means, and means for transferring the blank from the endless blank carrying means angularly thereto whereby said blank may be positioned for wrapping or folding around said form by said first named means.

6. In a carton making machine, the combination with an endless conveyor and means for wrapping or folding a blank around a form thereon, of endless blank carrying tapes arranged in spaced substantially parallel relation with said conveyor and adapted to transport the blank flatwise toward one end of the machine, means adjacent the opposite end of the machine for frictionally feeding the blank from a source of supply flatwise onto said tapes, and means for transferring the blank from the endless blank carrying means angularly thereto whereby said blank may be positioned for wrapping or folding around said form by said first named means.

7. In a carton making machine, the combination with an endless conveyor and means for wrapping or folding a blank around a form thereon, of endless means carrying the blank flatwise thereon and arranged in spaced substantially parallel relation with the conveyor, means for feeding the blank flatwise onto the endless blank carrying means, a blank gripping and turning roll receiving the blank from the carrying means and adapted to turn the blank substantially at right angles thereto, and means for feeding the blank from said gripping and turning roll across the path of travel of said form whereby the blank may be wrapped or folded therearound by said first named means.

8. In a carton making machine, the combination with a form movable in one direction along a closed path and means for wrapping or folding a blank around said form, of endless blank carrying means arranged horizontally over the form in spaced relation therewith and adapted to receive the blank from the top of a stack at one end of the machine and carry the blank flatwise toward the opposite end of the machine, means adjacent the stack for feeding the blank flatwise therefrom onto the endless carrying means, and means receiving the blank from the carrying means and adapted to feed said blank transversely thereof across the path of travel of the form whereby the blank is positioned to be wrapped or folded around said form by said first named means.

9. In a carton making machine, the combination with a form movable in one direction along a closed path and means for wrapping or folding a blank around said form, of endless blank carrying tapes arranged horizontally over the form in spaced relation therewith and adapted to receive the blank from the top of a stack at one end of the machine and carry the blank flatwise toward the opposite end of the machine, a driven roller adapted to frictionally engage the blank on the top of said stack and feed said blank flatwise therefrom onto said endless carrying tapes, and means for transferring the blank from the endless carrying tapes to a position for wrapping or folding around the form by said first named means.

10. In a carton making machine, the combination with a traveling form, of an endless blank carrying conveyor arranged in spaced relation with the form, means at the receiving end of said conveyor adapted to deliver a blank flatwise thereon, means at the delivery end of said conveyor adapted to take the blank therefrom and feed it across the path of travel of the form, means for moving the form and the conveyor along closed paths in opposite directions respectively, and means for wrapping or folding the blank around said form while it is traveling in a direction opposite to the direction of travel of the blank on said conveyor.

11. In a carton making machine, the combination with an endless conveyor having a form thereon, of endless blank carrying means arranged in spaced relation with the conveyor, means for delivering a blank flatwise onto the endless blank carrying means, mechanism for turning and feeding the blank from its carrying means angularly thereto across the path of travel of the form, means for driving the conveyor and the blank carrying means in opposite directions respectively, and means for wrapping or folding the blank around said form while it is traveling in a direction opposite to the direction of travel of the blank on said endless carrying means.

12. In a carton making machine, the combination with a traveling form, of blank carrying means arranged in spaced relation therewith, means adapted to take a blank from said carrying means and feed said blank across the path of travel of said form, means for moving the form and the blank carrying means in opposite directions through closed paths respectively, and means for wrapping or folding the blank around said form while it is traveling in a direction opposite to the direction of travel of the blank on the blank carrying means.

13. In a carton making machine, the combination with an endless conveyor and means for wrapping or folding a blank around a form thereon, of endless means carrying the blank flatwise thereon and arranged in spaced substantially parallel relation with the endless conveyor, means receiving the blank from said carrying means and adapted to turn said blank substantially at right angles thereto whereby the blank may be fed into position to be wrapped or folded around the form by said first named means, and means for registering the blank with respect to said blank turning means before the blank is turned thereby.

14. In a carton making machine, the combination with a form movable in one direction along a closed path, means for wrapping or folding a blank therearound, and means for registering the blank with respect to the form, of endless means carrying the blank flatwise thereon and arranged in spaced relation with the form, and means receiving the blank from the blank carrying means and adapted to turn said blank angularly thereto whereby the blank may be fed to said blank registering means.

15. In a carton making machine, the combination with an endless conveyor and means for wrapping or folding a blank around a form thereon, of endless means carrying a blank flatwise thereon, a clamp arranged to engage the blank adjacent a sealing flap thereof, an element adapted to bend or break over said flap while the blank is engaged by said clamp, and means for thereafter transferring the blank from the endless carrying means to a position for wrapping or folding around said form by said first named means.

16. In a carton making machine, the combination with a horizontally arranged endless conveyor and means for wrapping or folding a blank around a form thereon, of endless means supporting a blank flatwise thereon and disposed over said form in spaced parallel relation therewith, means for feeding the blank flatwise onto the blank carrying means from the top of a stack at one end thereof, a clamp arranged to engage the blank while it is supported flatwise on the carrying means, an element adapted to bend or break over a sealing flap of the blank while it is engaged by said clamp, a blank turning roll receiving the blank from the blank carrying means and turning said blank angularly thereto, and means for feeding the blank from the blank turning roll whereby the blank may be positioned for wrapping or folding around said form by said first named means.

17. In combination, a blank conveyor, means for stopping movement of a blank on said conveyor adapted to thereafter release the blank so that it travels with its conveyor, and mechanism adapted to bend or break over a sealing flap of the blank while it is stopped, said mechanism comprising a clamp arranged to engage the blank adjacent said flap, an element for bending or breaking over the flap and means for operating the clamp and said bending element.

18. In combination, a blank conveyor, a stationary jaw and a movable jaw disposed adjacent one side of said conveyor and adapted to clamp the blank adjacent a side sealing flap thereof, means for operating the movable jaw to clamp the blank, a flap bending element, and means for operating said element to bend the flap while the blank is clamped between said jaws.

19. In combination, a plurality of blank carrying tapes, a pair of relatively movable clamping elements disposed adjacent one of said tapes and adapted to clamp the blank near a sealing flap on one edge thereof, means for moving said elements relatively to clamp and release the blank, and means for bending or breaking over the sealing flap while the blank is clamped by said clamping elements.

20. In combination, a blank conveyor, a support adjustable toward and away from one side of said conveyor, blank clamping and flap bending means carried on said support, means for operating the clamping means causing it to clamp a blank on the conveyor adjacent a sealing flap of said blank, and means operating the bending means so that it breaks or bends over said flap while the blank is clamped by said clamping means.

21. In combination, a blank carrying tape or the like, a stationary jaw and a movable jaw mounted at one side of said tape and adapted to clamp a blank carried thereby adjacent a sealing flap on one edge of said blank, an element adapted to bend or break over said flap while the blank is clamped by said jaws, a pair of rock shafts on which the movable jaw and the bending element are mounted respectively, a power shaft, and cam operated connections between said power shaft and said rock shafts for operating the movable clamping jaw and said bending element.

22. In a carton making machine, a blank conveyor, a turning roll arranged to receive a carton blank from said conveyor and turn said blank angularly with respect thereto for delivery to another part of the machine, devices adapted to register the blank with respect to the turning roll, and means for bending or breaking over a sealing flap of the registered blank before it is delivered to said turning roll.

23. In a carton making machine, a blank conveyor, mechanism adjacent thereto adapted to grip a blank on the conveyor and turn said blank angularly with respect thereto for delivery to another part of the machine, means for registering the blank with respect to said mechanism while the blank is supported by the conveyor, and means for bending or breaking over a sealing flap of the blank before it is received by the gripping and turning mechanism.

24. In a carton making machine, a blank conveyor, a plurality of rolls having grippers adapted to seize a blank on said conveyor and turn the blank angularly with respect thereto for delivery to another part of the machine, means for front and side registering the blank with respect to said rolls, and means for bending or breaking over a sealing flap of the blank before it is seized by said grippers.

25. In a carton making machine, a blank conveyor, means for bending or breaking over a sealing flap of the blank while it is supported on said conveyor, mechanism for gripping the blank and turning it angularly with respect to the conveyor for delivery to another part of the machine, and devices for registering the blank with respect to said means and said mechanism.

26. In combination, a blank conveyor, means for stopping movement of a blank on said conveyor adapted to thereafter release the blank so that it travels with the conveyor, means for bending or breaking over a flap of the blank while it is stopped on the conveyor, and means for moving the blank laterally of the conveyor to register said blank with said bending means.

27. In combination, a blank conveyor, blank gripping and turning mechanism arranged to receive a blank from said conveyor, means for bending or turning over a flap of the blank while it is supported on the conveyor, and means for guiding the blank from the conveyor to said gripping and turning mechanism.

28. In combination, a blank conveyor, mechanism arranged to grip a blank on the conveyor and turn said blank angularly thereto for delivery to a carton conveyor, means for registering the blank with respect to said mechanism while the blank is supported on its conveyor, and rocking means for guiding the blank from the blank conveyor to the gripping and turning mechanism.

29. In combination, a blank conveyor, mechanism arranged to grip a blank on the conveyor and turn said blank angularly thereto for delivery to a carton conveyor, means for front and side registering the blank with respect to said mechanism, and a plurality of rocking fingers for guiding the blank from the conveyor to the gripping and turning mechanism.

30. In a carton making machine, a conveyor having a carton forming block secured thereto, mechanism for gripping a carton blank and turning the same toward the path of travel of said conveyor, means for feeding the blank from said mechanism to a position in front of the forming block, and means for folding or wrapping the blank around said forming block.

31. In a carton making machine, a movable carton forming block, mechanism for gripping and turning a carton blank toward the path of travel of said block, means for feeding the blank from said mechanism to a position in front of the forming block and comprising spaced sets of feed rollers driven at relatively different speeds, and means for folding or wrapping the blank around said block.

32. In a carton making machine, blank gripping and turning means operating to change the path of travel of a carton blank in the machine so that said blank may be fed to the carton conveyor, a carton forming block secured on said conveyor and around which the blank is folded or wrapped, and means for feeding the blank from said gripping and turning means into position to be folded or wrapped.

33. In combination, a driven shaft, a plurality of turning rolls fixed thereon, blank grippers carried by said rolls, means for delivering a blank to said grippers, and means on the rolls for lifting the blank when it is seized by the grippers and turned thereby with said rolls.

34. In combination, blank gripping and turning mechanism, means for delivering a blank thereto, and means mounted on the blank turning and gripping mechanism adapted to lift the blank when it is seized and turned by said mechanism.

35. In combination, blank gripping and turning mechanism, means for delivering a blank thereto, rocking fingers carried by said mechanism adapted to lift the blank when it is seized and turned by said mechanism, and cam operated means for rocking said fingers.

36. In combination, blank gripping and turning mechanism, means for delivering a blank thereto, a rock shaft journalled on said mechanism and provided with an arm carrying a roller, means on the rock shaft adapted to lift the blank as it is seized and turned by said mechanism, and a fixed cam engaging said roller and rocking said rock shaft as the mechanism is rotated.

37. In combination, a rotating shaft, blank turning rolls fixed on said shaft to rotate therewith, blank grippers carried by said rolls, means for delivering a blank to the grippers and rolls, blank lifting means mounted on the turning rolls including a rock shaft provided with a crank arm, and means for rocking the shaft comprising a fixed cam loosely mounted on said rotating shaft and engaging said crank arm.

38. In combination, blank gripping and turning mechanism including a plurality of turning rolls, means for delivering a blank to said mechanism, means on said rolls for lifting the blank as it is seized and turned by the blank gripping and turning mechanism, and means for holding the blank against said rolls as it is turning therewith.

39. In combination, blank gripping and turning mechanism including a plurality of rotating turning rolls, means for delivering a blank to said mechanism, means for lifting the blank as it is seized and turned by the blank gripping and turning mechanism, a shaft driven from said turning mechanism, and a plurality of rollers fixed on said shaft and adapted to hold the blank against the turning rolls.

40. In combination, a driven shaft, a plurality of blank turning rolls fixed on said shaft to rotate therewith, blank grippers carried by the turning rolls, means for operating said grippers as the rolls are turning, a rock shaft having arms fixed thereon, a shaft journalled in said arms and provided with rollers for holding the blank against the turning rolls, and gearing interposed between said last-named shaft and the driven shaft for driving said rollers.

41. In combination, blank conveying means, a device adjacent thereto for bending or breaking over a sealing flap of the blank, blank turning and feeding means arranged to feed the blank with the sealing flap bent over, from the blank conveying means to a position in the path of travel of a carton forming block, and means for folding or wrapping the blank around said block.

42. In combination, blank conveying means, mechanism adjacent thereto for bending or breaking over a sealing flap of the blank, blank turning and feeding means arranged to feed the blank with the sealing flap bent over, from the blank conveying means to a position in the path of travel of a carton forming block, means for applying adhesive to the bent over flap before the blank reaches said position, and means for folding or wrapping the blank around said block.

43. In combination, blank conveying means, a device adjacent thereto for bending or breaking over a sealing flap of the blank, a continuously moving carton conveyor having a forming block secured thereon, blank turning and feeding means arranged to feed the blank with the sealing flap bent over, from the blank conveying means to a position in the path of travel of the forming block, and means for folding or wrapping the blank around said block.

44. In combination, blank conveying means, a device adjacent thereto for bending or breaking over a sealing flap of the blank, blank turning and feeding means arranged to feed the blank with the sealing flap bent over, from the blank conveying means to a movable form, means for applying adhesive to said flap before the blank reaches the form, and means for folding or wrapping the blank around said form.

45. In combination, means for bending or breaking over the side sealing flap of a carton blank, a movable form, means for feeding the blank with its side sealing flap bent over, from said bending means to a position in the path of travel of the form, said feeding means including a blank turning roll and feed rollers receiving the blank from said turning roll, and means for folding or wrapping the blank around said form.

46. In combination, means for bending or breaking over a sealing flap of a carton blank and comprising a pair of members arranged for relative bodily movement, means for imparting relative bodily movement to said members, means that feed the blank from the bending members and apply adhesive to the bent over flap, high speed rollers thereafter receiving the blank, a moving form in front of which the blank is delivered by said high speed rollers, and means for folding or wrapping the blank around said form.

47. In combination, means for bending or breaking over a sealing flap of a carton blank, means for feeding the blank from said bending means to a movable form and including spaced sets of rollers driven at relatively different speeds, and means adjacent one of the sets of rollers for applying adhesive to the bent over sealing flap before the blank is fed by the other set or sets of rollers.

48. In combination, means for bending or breaking over a sealing flap of a carton blank, blank feeding mechanism receiving the blank from said bending means and including spaced sets of rollers driven at relatively different speeds, and means disposed adjacent one of the sets of rollers for applying adhesive to the bent over flap, said last-named means comprising a glue roller and a pressure roller between which said flap passes before the blank is fed by the other set or sets of rollers.

49. In combination, spaced sets of blank feeding rollers driven at relatively different speeds, a glue roller and a pressure roller arranged in opposed relation substantially at right angles to one of said sets of feeding rollers and between which a bent over sealing flap of the blank passes before said blank is fed by the other set or sets of blank feeding rollers, and means for moving the glue roller and the pressure roller relatively to apply adhesive on one side of said flap.

50. In combination, spaced sets of rollers driven at relatively different speeds and adapted to feed a blank with a sealing flap thereof bent over, adhesive applying means adjacent one of the sets of rollers and comprising a glue roller and a pressure roller one movable toward and away from the other and between which said flap passes before the blank is fed by the other set or sets of blank feeding rollers, and means timed to move the glue roller and the pressure roller relatively towards each other while the sealing flap is passing therethrough.

51. In combination, an upper set of rollers and a lower set of rollers driven at a higher rate of speed than that of the upper set, said rollers being adapted to feed a blank to a movable form with the side sealing flap of the blank bent over, adhesive applying means adjacent the upper set of rollers and comprising a glue roller and a pressure roller one movable toward and away from the other and between which the side sealing flap passes before the blank is fed by said lower set of rollers, and means for moving the glue roller and the pressure roller relatively towards each other while the side sealing flap is passing therethrough so that adhesive is applied to one side of said flap.

52. In combination, a movable form, spaced sets of rollers driven at relatively different speeds and arranged to feed a blank to the movable form with a sealing flap of said blank bent over to receive adhesive, and means adjacent one of the sets of rollers for applying adhesive to said flap before the blank is fed by the other set or sets of rollers.

53. In combination, a movable form, spaced sets of rollers driven at relatively different speeds and arranged to feed a blank to the movable form with a sealing flap of said blank bent over, driven means adjacent one of the sets of rollers for applying adhesive to said flap before the blank is fed by the other set or sets of rollers, and a blank operated device controlling the operation of said means.

54. In combination, a movable form, spaced sets of rollers driven at relatively different speeds and arranged to feed a blank to the movable form with a sealing flap of said blank bent over, driven means adjacent one of the sets of rollers for applying adhesive to said flap and comprising a glue roller and a pressure roller one movable toward and away from the other and between which the flap passes before the blank is fed by the other set or sets of blank feeding rollers, means for preventing relative bodily movement of said glue and pressure rollers in the event no blank is fed by said sets of rollers, and a blank operated device rendering said last-named means ineffective when a blank is fed by the sets of rollers.

55. In combination, a set of blank feeding rollers, means adjacent the same for applying adhesive to a blank while it is being fed through said set of rollers, detector mechanism for controlling the operation of said means, a movable carton forming block, and a second set of feeding rollers driven at a higher speed than said first set and adapted to feed the glued blank into the path of travel of said forming block after said blank has been fed past the adhesive applying means.

56. In a carton making machine, low speed blank feeding rollers, a movable form, opposed high speed blank feeding rollers receiving the blank from the low speed rollers and delivering it across the path of travel of the movable form for wrapping or folding therearound, means for imparting relative bodily movement to said high speed rollers whereby they are opened to receive the blank from the low speed rollers and closed to feed the blank across said path, and gearing for driving the opposed high speed rollers one from the other when they are closed.

57. In a carton making machine, a set of low speed blank feeding rollers, a movable form, a set of opposed high speed rollers receiving the blank from the low speed rollers and delivering it across the path of travel of the movable form for wrapping or folding therearound, a pair of shafts on which the opposed high speed rollers are mounted, means for rocking the shafts whereby the opposed high speed rollers are opened to receive the blank from the low speed rollers and closed to feed the blank across said path, and gears on said shafts adapted to mesh and drive one shaft from the other when the shafts are rocked to close the high speed rollers.

58. In a carton making machine, a set of low speed blank feeding rollers arranged in opposed relation on a pair of relatively movable shafts, means yieldably urging one of said shafts toward the other and providing for feeding of a blank between said rollers, gears on said shafts for driving one of the same from the other, a movable form, and a set of high speed rollers receiving the blank from the low speed rollers and delivering the blank across the path of travel of said form for wrapping or folding therearound.

59. In combination, a set of low speed blank feeding rollers, a movable form, a set of high speed rollers receiving the blank from the low speed rollers and delivering it to the movable form, and a rock shaft carrying certain low speed rollers that are yieldably urged toward other low speed rollers, said shaft also carrying certain high speed rollers that are rocked by the shaft toward and away from other high speed rollers.

60. In combination, a set of low speed blank feeding rollers, a movable form, a set of high speed rollers receiving the blank from the low speed rollers and delivering it to the movable form, a rock shaft and means for rocking the same, arms loosely mounted on the rock shaft and carrying certain low speed rollers opposing other low speed rollers, means yieldably urging said arms to hold the low speed rollers in opposing relation, and arms fixed on the rock shaft and carrying certain high speed rollers that oppose other high speed rollers and are rocked by said shaft relatively thereto.

61. In combination, a first set of blank feeding rollers mounted on parallel shafts geared together, a movable form, a second set of blank feeding rollers mounted on parallel shafts geared together, said second set of rollers receiving the blank from the first set and delivering said blank to the movable form, means for driving a shaft of the first set of rollers at low speed, and means for driving a shaft of the second set of rollers at high speed.

62. In a carton making machine, a movable form, a blank support movable toward and away from a position where a blank is registered with respect to the form, means for moving the form past the blank support, means for feeding the blank in one direction across the path of travel of said form and onto the support while the latter is moved away from the blank registering position, means for reciprocating the support timed to move it toward said position so that the blank is carried thereto in the opposite direction before the form passes said support, and means for wrapping or folding the registered blank around said form.

63. In a carton making machine, a movable blank support, a form movable past the same, means for moving the support in one direction to receive a blank and in the opposite direction to carry the blank to a registering position with respect to the form, means for feeding the blank across the path of travel of the form and onto the support while the latter is moved away from the blank registering position, means for operating the form timed to move it past the support after the blank has been carried thereby to said position, and means for wrapping or folding the registered blank around said form.

64. In a carton making machine, a movable form, means for feeding a blank across the path of travel of said form, blank supporting and registering means arranged adjacent the path of travel of the form and movable in one direction to receive the blank from said feeding means and in the opposite direction to register the blank with respect to the form, means for moving the form past the blank supporting and registering means, mechanism for operating the blank supporting and registering means timed to move the same so that the blank thereon is registered with respect to the form before it passes said blank supporting and registering means, and means for wrapping or folding the registered blank around said form.

65. In a carton making machine, movable blank supporting and registering means, a form movable past the same, means for feeding the blank across the path of travel of said form, mechanism for moving said blank supporting and registering means first in one direction to receive the blank from said feeding means and then in the opposite direction to register the blank with respect to the form, means for operating the form timed to move it past the blank supporting and registering means after the same has registered the blank with respect to the form, and means for wrapping or folding the registered blank around said form.

66. In a carton making machine, a movable form, a blank supporting device movable in one direction to receive a blank and in the opposite direction to register it lengthwise of the form, a blank engaging device movable to register the blank crosswise of the form, means for moving the form past the blank supporting and engaging devices, mechanism for reciprocating the blank supporting and engaging devices timed to move them relatively to each other so that they register the blank lengthwise and crosswise with respect to the form before it passes said devices, and means for wrapping or folding the registered blank around said form.

67. In a carton making machine, a movable form, means for feeding a blank across the path of travel of said form, a pair of spaced blank supporting devices between which the form passes and movable in one direction to receive the blank from said feeding means and in the opposite direction to register it with respect to the form, and means for operating the blank supporting devices timed to move them so that they register the blank with respect to the form before it passes between said devices.

68. In a carton making machine, a movable form, means for feeding a blank across the path of travel of said form, stationary supporting means providing an opening across which the blank is fed by said feeding means, a pair of devices slidably mounted on said supporting means at opposite sides of the opening therein respectively and movable in one direction to receive the blank and in the opposite direction to register it with respect to the form, means for moving the form between the slidably mounted devices and through said opening to engage the blank and carry it forward for wrapping or folding around the form, and means for reciprocating the slidably mounted devices timed to move them so that they register the blank with respect to the form before it engages said blank.

69. In a carton making machine, a movable form, a blank supporting device arranged adjacent the path of travel of the form and movable in one direction to receive a blank and in the opposite direction to register it lengthwise with respect to the form, a blank engaging device arranged adjacent the path of travel of the form and movable transversely of the path of movement of the blank supporting device to register the blank crosswise with respect to the form, means for moving the form past the blank supporting and engaging devices, and mechanism for reciprocating said blank supporting device and the blank engaging device timed to move them relatively to each other so that they register the blank with respect to the form before it passes said devices.

70. In a carton making machine, a movable form around which a blank is wrapped or folded while the form is in a vertical position, a pair of vertically reciprocated blank supporting devices between which the form passes and movable downwardly to receive a blank and upwardly to register it vertically with respect to the form, a blank engaging device past which the form travels and movable transversely of the path of movement of the blank supporting devices to register the blank laterally with respect to the form, and means for reciprocating the blank supporting and engaging devices timed to move them relatively to each other so that they register the blank with respect to the form before it passes said devices.

71. In a carton making machine, a pair of spaced plates extending transversely thereof and between which a moving form of said machine travels, blank supporting and engaging devices past which the form moves and slidably mounted on said plates for movement along paths extending transversely of each other, means for feeding a blank to the blank supporting and engaging devices, and means for reciprocating the blank supporting and engaging devices timed to move them relative to each other so that they register the blank lengthwise and crosswise with respect to said form before it passes said devices.

72. In a carton making machine, a movable form, a support at one side of the path of movement of the form, a pair of members arranged for sliding movement on said support along paths extending transversely of each other, a corresponding number of blank registering devices carried by said members and past which the form travels, and means for reciprocating the members timed to move them relative to each other so that the devices carried thereby register a blank with respect to the form before said form passes said devices.

73. In a carton making machine, a movable form, stationary supporting means providing an opening across which a blank is fed, a pair of blank supports slidably mounted on said supporting means at opposite sides of the opening therein and movable in one direction to receive the blank and in the opposite direction to register it lengthwise with respect to the form, a blank engaging element arranged on the stationary supporting means for sliding movement transversely of the paths of movement of the blank supports and adapted to register the blank crosswise with respect to the form, means for moving the form between the blank supports, past the blank engaging element, and through said opening, to engage the blank and carry it forward for wrapping or folding around the form, and means for reciprocating the blank supports and the blank engaging element timed to move them relatively to each other so that they register the blank lengthwise and crosswise with respect to the form before it engages said blank.

74. In a carton making machine, a pair of spaced stationary supports, a pair of blank registering devices slidably mounted on one of the stationary supports forwardly thereof and movable along paths extending transversely of each other, a pair of spaced folding rollers each journaled on one of the stationary supports rearwardly thereof, a form arranged to engage a blank at the blank registering devices and carry said blank through the supports and said folding rollers, and means for operating said blank registering devices timed to move them relatively to each other so that they register the blank with respect to the form before said form engages the blank.

75. In a carton making machine, a pair of spaced stationary supports, blank registering devices slidably mounted on the stationary supports forwardly thereof, a pair of folding rollers adjustably mounted on the stationary supports rearwardly thereof, a form arranged to engage a blank at the blank registering devices and carry the blank through the supports and said folding rollers, means for feeding the blank across the path of travel of the form to the blank registering devices, and means for operating said blank registering devices timed to move them so that they register the blank with respect to the form before said form engages the blank.

76. In combination, a movable form, means for feeding a blank thereto, and means for folding or wrapping the blank around said form including a carriage arranged to be reciprocated substantially parallel with the path of travel of the form, means for reciprocating said carriage, a slide movable laterally of the carriage and mounted thereon, a panel folder pivoted on said slide, and means for reciprocating the slide, and mechanism controlled by said slide for swinging said panel folder.

77. In combination, a movable form, means for feeding a blank thereto, and means for folding or wrapping the blank around said form including a reciprocating carriage, a reciprocating slide mounted on said carriage and movable transversely thereof, a panel folder pivoted on said slide, and means controlled by the slide for swinging said folder during reciprocating movements of the carriage and the slide.

78. In combination a blank folder, a slide on which said folder is pivoted, a carriage for the slide and across which the latter is reciprocated, means for reciprocating the slide and swinging said folder, and other means for reciprocating said carriage.

79. In combination, a blank folder, a slide on which said folder is mounted, and means for reciprocating said slide comprising a pair of rollers thereon and a rocking shaft extending between said rollers in engagement therewith.

80. In combination, a carriage, means for reciprocating said carriage, a slide movable on the carriage transversely thereof and carrying a blank folder, and means for moving said slide during reciprocation of the carriage comprising a pair of rollers on said slide and a rocking shaft extending between said rollers.

81. In combination, a carriage, means for reciprocating said carriage, a slide movable transversely of the carriage during its reciprocating movement and provided with a swinging blank folder, means for reciprocating said slide, and means for swinging the blank folder comprising a bell-crank mounted on a fixed pivot and a rod connected with said bell-crank and the blank folder.

82. In combination, a blank folder, a slide on which said folder is pivoted, a carriage for the slide and across which the latter is reciprocated, means for reciprocating the slide and swinging said folder, and means for reciprocating said carriage comprising a member slidably mounted thereon, a pair of rotatable devices, an endless element passing around the rotatable devices and connected with said member, and mechanism for driving the endless element and said rotatable devices and operatively connected with one of the latter.

83. In combination, a blank folder, a slide on which said folder is pivoted, a carriage for the slide and across which the latter is reciprocated, means for reciprocating the slide and swinging said folder, and means for reciprocating said carriage comprising a member slidably mounted thereon, a pair of sprockets, a chain passing around the same, a stud connecting the chain with said member, and mechanism for driving said chain and said sprockets and operatively connected with one of the latter.

84. In a carton making machine, a moving form, means for delivering a carton blank thereto, means for folding or wrapping the blank around the form, and mechanism adapted to move toward and embrace the form, clamp the carton on the form, travel therewith, release the carton and form, and move away from the same.

85. In a carton making machine, a moving form, means for delivering a carton blank thereto, means for folding or wrapping the blank around the form, a pair of clamping jaws, and mechanism for operating said jaws whereby they are caused to move toward the form and clamp the carton on opposite sides thereof, travel with the form, release the carton and form and move away from the same.

86. In combination, a moving form, means for delivering a carton blank thereto having a flap glued on one side, means for folding the blank around the form adapted to seal a panel of the blank to the glued side of said flap, and means for pressing the panel against said flap comprising a clamp and devices causing said clamp to move toward and embrace the form, engage the carton adjacent said flap, travel with the form, release the carton and form, and move away from the same.

87. In combination, a moving form, means for delivering a carton blank thereto, means for folding or wrapping the blank around the form, movable mechanism adapted to embrace and clamp the carton on the form, travel therewith, release the carton and form, and move away from the same, and means for pressing a side of the carton on the form.

88. In combination, a moving form, means for delivering a carton blank thereto, means for folding or wrapping the blank around the form, movable mechanism adapted to move toward and embrace the form, clamp the carton on the form, travel therewith, release the carton and form, and move away from the same, and yieldable means forming part of said mechanism and adapted to press a side of the carton against the form.

89. In combination, means for embracing and clamping a carton on a moving form, and mechanism for reciprocating said means substantially parallel with and toward and away from the form.

90. In combination, a pair of pivoted jaws for clamping a carton on a moving form, means for reciprocating said jaws bodily toward and away from the form adapted to clamp and release them with respect to the carton and the form, and means for reciprocating the jaws bodily in the line of travel of the form.

91. In combination, a moving form, a carriage or saddle arranged to be reciprocated transversely of the path of travel of the form, a slide mounted on the carriage or saddle for movement substantially parallel with said path, a pair of jaws pivoted on said slide adapted to be engaged with and disengaged from a carton on the form, means for reciprocating the carriage or saddle, means for reciprocating the slide, and means for closing and opening said jaws as the carriage or saddle is moved toward and away from said form.

92. In combination, a moving form, a carriage or saddle arranged to be reciprocated transversely of the path of travel of said form, a slide carried by the carriage or saddle and movable substantially parallel with the path of travel of the form, a pair of jaws pivoted on said slide adapted to be engaged with and disengaged from a carton on the form, cam operated means for reciprocating the slide, and means for closing and opening said jaws as the saddle is moved toward and away from said form.

93. In combination, a moving form, a reciprocating carriage moving transversely of the path of travel of said form, a reciprocating slide mounted on said carriage and moving substantially parallel with the path of travel of the form, a press frame mounted on said slide, a pair of jaws pivoted on said frame adapted to be engaged with and disengaged from a carton on the moving form, means for closing and opening said jaws as the carriage is moved toward and away from the form, a plate movably mounted on said press frame, and means holding said plate yieldingly against the carton while the jaws are clamped on the latter and said form.

94. In combination, pivoted carton clamping jaws, a toggle for closing and opening said jaws, a member slidably connected with said toggle for operating the same, and means for moving said member laterally and longitudinally.

95. In combination, pivoted carton clamping jaws, a toggle for closing and opening said jaws, a member having a slotted portion engaged by an element of said toggle, and means for moving said member laterally and longitudinally.

96. In combination, pivoted carton clamping jaws, a toggle for closing and opening said jaws, means for operating the toggle, a slide on which the jaws are mounted, and means for reciprocating said slide during the closing and opening movement of the jaws.

97. In combination, pivoted carton clamping jaws, a toggle for closing and opening said jaws, means for operating the toggle comprising a member slidably connected therewith, means for moving said member laterally and longitudinally comprising a bell-crank one arm of which is pivoted to said member and a second bell-crank one arm of which is slidably connected with the member, and means connecting the other arms of the bell-cranks whereby the latter may be rocked together.

98. In combination, pivoted carton clamping jaws, a toggle for closing and opening said jaws, means for operating the toggle comprising a member slidably connected therewith, means for moving said member laterally and longitudinally comprising a bell-crank one arm of which is pivoted to said member and a second bell-crank one arm of which is slidably connected with the member, means connecting the other arms of the bell-cranks whereby the latter may be rocked together, and cam operated means for rocking said bell-cranks.

99. In combination, a slide, means for reciprocating said slide, a pair of carton clamping jaws pivoted on the slide, a toggle for closing and opening said jaws, and means for operating said toggle.

100. In combination, a slide, means for reciprocating said slide, a pair of carton clamping jaws pivoted on the slide, a toggle for closing and opening said jaws, guide means on the slide for an element of the toggle, and means for operating said toggle.

101. In combination, a support, a pair of carton clamping jaws pivoted thereon, a toggle for closing and opening the jaws, a guide on the slide, a toggle element provided with a pair of rollers one of which is engaged in said guide, and means engaging the other roller for operating the toggle.

102. In a carton making machine, an endless blank carrying conveyor and an endless form carrying conveyor arranged in spaced substantially parallel relation, and means for transferring a blank angularly from a flatwise position on said blank carrying conveyor to a position for wrapping or folding around a form on said form carrying conveyor.

103. In a carton making machine, an endless blank carrying conveyor and an endless form carrying conveyor arranged in superposed substantially parallel relation, and a blank gripping and turning roll for transferring a blank angularly from a flatwise position on said blank carrying conveyor to a position for wrapping or folding around a form on said form carrying conveyor.

104. In a carton making machine, a blank carrier and a form carrier arranged in spaced relation, means for transferring a blank from the blank carrier to a position for wrapping or folding around a form on said form carrier, means for moving the blank carrier and the form carrier in opposite directions along closed paths respectively, and means for wrapping or folding the blank around said form to be carried thereby in a direction opposite to the direction of travel of the blank on said blank carrier.

In testimony whereof I have signed this specification.

GEORGE A. ROBINSON.